US009154473B1

(12) United States Patent
Coleman et al.

(10) Patent No.: US 9,154,473 B1
(45) Date of Patent: Oct. 6, 2015

(54) ELECTRONIC COMMUNICATIONS MANAGEMENT SYSTEM AND METHOD

(75) Inventors: Christian Taruskin Coleman, Mission Viejo, CA (US); Randy Rector, San Clemente, CA (US)

(73) Assignee: CRRC, Inc., Irvine, CA (US)

( * ) Notice: Subject to any disclaimer, the term of this patent is extended or adjusted under 35 U.S.C. 154(b) by 689 days.

(21) Appl. No.: 13/542,525

(22) Filed: Jul. 5, 2012

Related U.S. Application Data

(60) Provisional application No. 61/504,965, filed on Jul. 6, 2011.

(51) Int. Cl.
*G06F 15/16* (2006.01)
*H04L 29/06* (2006.01)

(52) U.S. Cl.
CPC ........ H04L 63/0442 (2013.01); H04L 63/0823 (2013.01)

(58) Field of Classification Search
CPC .. H04L 63/0442; H04L 63/0823; G06F 15/16
See application file for complete search history.

(56) References Cited

U.S. PATENT DOCUMENTS

| | | | | | |
|---|---|---|---|---|---|
| 5,694,616 | A * | 12/1997 | Johnson et al. | ............... | 709/207 |
| 6,694,025 | B1 * | 2/2004 | Epstein et al. | ................ | 380/279 |
| 7,050,445 | B1 * | 5/2006 | Zellner et al. | ................ | 370/412 |
| 7,293,171 | B2 * | 11/2007 | Batthish et al. | ............... | 713/152 |
| 7,421,472 | B1 * | 9/2008 | Ross, Jr. | ......................... | 709/206 |
| 7,475,422 | B1 * | 1/2009 | Bull et al. | .......................... | 726/3 |
| 7,523,309 | B1 * | 4/2009 | Talbot et al. | .................. | 713/166 |
| 7,577,710 | B2 * | 8/2009 | Stauffer | ........................ | 709/207 |
| 7,822,820 | B2 * | 10/2010 | LeVasseur et al. | ............ | 709/206 |
| 7,882,183 | B2 * | 2/2011 | Craft et al. | ..................... | 709/206 |
| 7,917,593 | B1 * | 3/2011 | Lee | ............................... | 709/206 |
| 7,921,456 | B2 * | 4/2011 | Chua | ................................ | 726/10 |
| 8,051,138 | B2 * | 11/2011 | Madnani | ....................... | 709/206 |
| 8,103,724 | B2 * | 1/2012 | Dawson et al. | ............... | 709/206 |
| 8,676,903 | B2 * | 3/2014 | Bansal et al. | ................. | 709/206 |
| 2003/0050981 | A1 * | 3/2003 | Banerjee et al. | ............. | 709/206 |
| 2006/0123476 | A1 * | 6/2006 | Yaghmour | ...................... | 726/22 |

(Continued)

OTHER PUBLICATIONS

Connell, "Enhancing E-Mail Security with S/MIME," Apr. 25, 2009, pp. 1-8, retrieved from https://web.archive.org/web/20090315000000*/http://www.ibm.com/developerworks/lotus/library/ls-SMIME/.*

(Continued)

*Primary Examiner* — Kaveh Abrishamkar
*Assistant Examiner* — James J Wilcox
(74) *Attorney, Agent, or Firm* — Knobbe, Martens, Olson & Bear, LLP

(57) ABSTRACT

A system and methods that prioritize email based on the use of cryptographic signatures are described. The system can allow email to be received without blocking a subset of the email. When email is received, the system can determine whether the email is received from an approved user who has exchanged public keys with the email recipient and determines whether the email includes one or more cryptographic signatures. Emails with signatures that are successfully verified can be identified as having a higher priority level than emails without the cryptographic signatures. The emails with the higher priority level can be presented to the recipient in a priority inbox. Emails without the signatures can be placed in a different folder, which is not presented to the user by default, but can be presented to the user in response to a request from the user.

23 Claims, 13 Drawing Sheets

(56) References Cited

U.S. PATENT DOCUMENTS

2006/0200523 A1* 9/2006 Tokuda et al. ............... 709/206
2009/0063551 A1 3/2009 Shuster

OTHER PUBLICATIONS

OpenDKIM, "DKIM," Dec. 26, 2009, pp. 1-12.*
Clapham. "Secure E-Mail Using Digital Certificates," Dec. 22, 2009, pp. 1-6.*
Tschabitscher, "How to Chat with Somebody (or a Group) in Gmail," Jan. 14, 2011, p. 1.*
Heinz Tschabitscher, Matador Spam Fighter 1.0—Outlook Spam Filtering Add-On, [http://email.about.com/od/bayesianoutlookfilters/gr/matador_spam_f.htm] in one page (downloaded on Jul. 11, 2012).
2012 Spam Filter Product Comparisons, [http://spam-filter-review.toptenreviews.com/] in four pages (downloaded on Jul. 11, 2012).
Heinz Tschabitscher, Top 13 Free Spam Filters for Windows [http://email.about.com/od/windowsspamfightingtools/tp/free_spam.htm] in 3 pages (downloaded on Jul. 11, 2012).
Justin Premick, A Weber Email Marketing Tips [http://www.aweber.com/blog/email-deliyerability/whitelisting-feedback-loops.htm] in 11 pages (downloaded on Jul. 11, 2012).

* cited by examiner

ELECTRONIC COMMUNICATIONS MANAGEMENT SYSTEM AND METHOD

RELATED APPLICATION

This application claims the benefit of priority under 35 U.S.C. §119(e) of U.S. Provisional Patent Application No. 61/504,965, filed on Jul. 6, 2011, and entitled "ELECTRONIC COMMUNICATIONS MANAGEMENT SYSTEM AND METHOD," the disclosure of which is hereby incorporated by reference in its entirety.

BACKGROUND

At one time, the majority of written communication between people and businesses was conducted through mail sent via the post office. Included with the mail was often junk mail. Although often an annoyance, junk mail was relatively manageable for most people because, for example, the time and expense to create junk mail kept the quantity of junk mail to a manageable level.

Today, the majority of written communication is conducted via electronic means, such as email. The relative ease of creating junk electronic mail, or spam as it is often termed, has vastly increased the amount of spam created and received compared to traditional mail. Dealing with the vast amount of spam is not only a great annoyance to users, but can be quite costly to both users and businesses. For example, employees may spend time dealing with spam that could have been spent attending to more productive tasks. Further, some businesses spend extra capital and require additional resources to handle spam that could have been spent in a more beneficial manner.

SUMMARY

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

Certain embodiments described herein include a method for performing prioritized communication may be performed. In some cases, the method may be performed by a computing system including one or more processors. In some embodiments, the method includes outputting a graphical user interface (GUI) that provides functionality for a user to create a first email. Further, the method includes receiving the first email that the user created with the GUI at a communication system and identifying an intended recipient of the first email. The method further includes determining, by one or more processors, whether the intended recipient is included in a set of users associated with the first user. In response to determining that the intended recipient is included in the set of users, the method includes accessing a first private key associated with the first user. The method further includes using the first private key to create a first signature based at least in part on the header of the first email. Moreover, the method includes accessing a second private key associated with the first user. Using the second private key, a second signature based at least in part on the body of the first email is created. In addition, the method includes sending the first email, the first signature, and the second signature to the intended recipient, thereby enabling a recipient communication system associated with the intended recipient to prioritize the first email.

In certain embodiments, a system for prioritized communication is disclosed. The system includes a communication director comprising computer hardware. The communication director is configured to receive an email from a first user and identify an intended recipient of the email. Further, the system includes a user association module configured to determine whether the intended recipient is in a set of one or more users associated with the first user by the first user. In addition, the system includes a signature module configured to create one or more signatures based on a portion of the email in response to the user association module determining that the intended recipient is included in the set of one or more users. Moreover, the communication director is further configured to send the email and the one or more signatures to the intended recipient, thereby enabling a recipient communication system associated with the recipient to prioritize the email.

In some embodiments, a non-transitory physical computer storage comprising computer-executable instructions that, when executed by one or more processors, direct a computing system to perform a method for prioritized communication is disclosed. The method includes receiving a request at a communication system from a first user to associate a second user with the first user. Further, the method includes causing an indication of the request to be presented to the second user. In response to causing the indication of the request to be presented to the second user, the method includes receiving a confirmation from the second user to associate the second user with the first user. In response to receiving the confirmation, the method includes storing an association between the first user and the second user. Storing the association, in some cases, comprises including the second user in a first set of users associated with the first user. The method further includes receiving an email from the first user and identifying an intended recipient of the email, the intended recipient comprising the second user. In addition, the method includes determining whether the intended recipient is included in the first set of users associated with the first user. In response to determining that the intended recipient is included in the first set of users, associating the email with a priority indicator and the intended recipient, thereby enabling a recipient communication system associated with the recipient to present the email to the recipient in a priority inbox.

In certain embodiments, a method for prioritized communication is disclosed. The method includes receiving an email addressed to a first user at a communication system and identifying a sender of the email. Further, the method includes determining, by one or more processors, whether the sender is included in a set of users associated with the first user. In response to determining that the sender is included in the set of users associated with the first user, the method includes accessing at least one key associated with the sender and using the at least one key to verify one or more signatures included with the email. In response to a successful verification of the one or more signatures, associating the email with a priority inbox of the first user, thereby enabling the communication system to present the second email to the first user upon the first user accessing the communication system.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Figure 1:
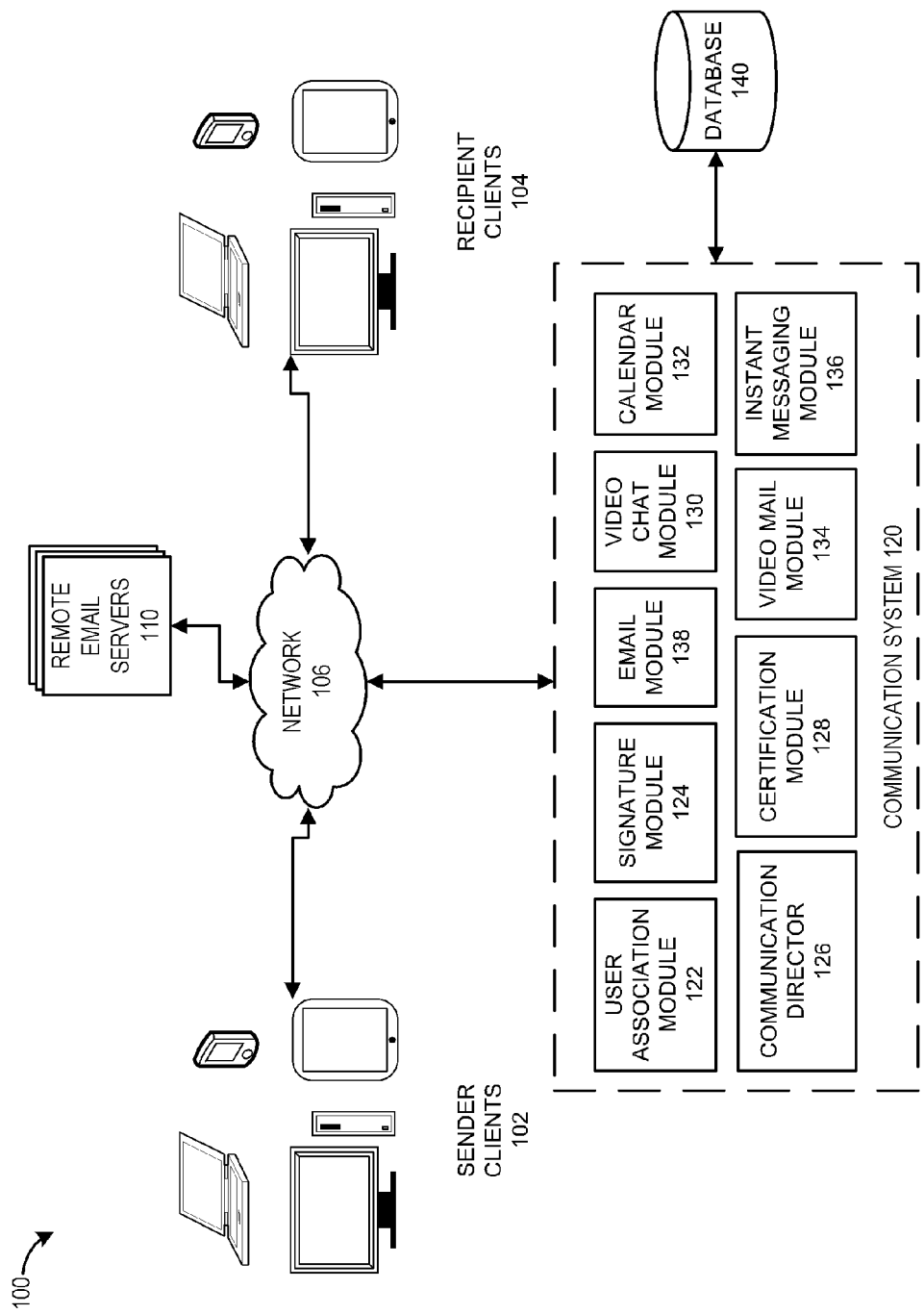
FIG. 1 is a block diagram of an embodiment of an electronic communication environment configured to implement priority communication.

To tackle the problem of spam, or unsolicited email, users often use various spam blockers. Some spam blockers use blacklists to identify known spammers and block the spam from a user's email account. Other spam blockers may use whitelists to allow only email from senders that are identified on the white list. Another option is to use rules to identify possible spam based on a set of criteria that is generally associated with some spam. For example, the rules may use keyword checks to identify email content that is often associated with spam (e.g., money scams, weight loss supplements, etc.). Each of these solutions help reduce spam, but they do not eliminate spam. Further, sometimes non-spam email is inadvertently blocked by the spam blockers causing users to lose potentially important communications.

One solution to the spam problem is to allow email to enter a user's email account and to prioritize the email enabling a user to quickly identify email from particular senders who have been identified as buddies, friends, priority contacts, or approved contacts. Emails from buddies can be associated with one priority level, and emails from other users can be associated with a lower priority level. In some cases, the approved contacts may be a subset of a user's contacts. Emails that are from buddies can be placed in a priority inbox, which is presented to a user upon logging into the user's email account. In one embodiment, emails that are not from buddies are not presented to the user upon logging into the user's email account and instead may be placed in a separate location, such as a separate email folder or non-priority inbox. However, a user can view the emails by, for example, selecting a link or providing a command to the email system to present the non-priority emails or the emails that are associated with a lower priority than the emails from buddies. Thus, the priority inbox can be like a hotel penthouse in that, in certain embodiments, only select email senders (e.g, the user's buddies) can access the penthouse. Similarly, the non-priority inbox can be like a hotel lobby in that any email sender can access the lobby.

In certain embodiments, an email allower system described herein can use one or more encryption keys to create signatures for communications sent via the prioritized communication system and to verify emails received from senders. A user of the prioritized communication system can identify contacts, or email addresses associated with contacts, who the user wants to associate with the high priority inbox. The contacts that have been identified by the user can be given access to one or more encryption keys associated with the user. Similarly, each contact can provide the user with one or more encryption keys associated with the contact. When a contact sends an email to the user via the prioritized communication system, one or more signatures are created using the contact's one or more encryption keys. The prioritized communication system can identify the sender, and if the sender is one of the user's contacts, use the sender's key(s) to verify the one or more signatures received with the email. If the one or more signatures are successfully verified, the email can be placed in the user's priority inbox. Other received emails may not be allowed into the priority inbox and instead can be placed in the non-priority inbox or some other email folder.

Similarly, when the user desires to send an email to a buddy, the prioritized communication system can create one or more signatures using the user's one or more keys. If the recipient is a buddy of the user, the recipient can verify the one or more signatures using the key(s) provided by the user. Any type of cryptographic hash function keys can be used to create the one or more signatures. For example, the signatures can use be created using asymmetric public/private key pairs using algorithms such as SHA-2 or SHA-3, MD5/MD6, combinations of the same, or the like. In some cases, the email may be certified using one or more additional keys to encrypt the email.

System Overview

FIG. 1 is a block diagram of an example electronic communication environment 100 configured to implement priority communication. The electronic communication environment 100 can include a number of clients, such as the sender clients 102 and the recipient clients 104. These clients can include any type of computing system that can provide a user with access to electronic communications including email. For example, the sender clients 102 and the recipient clients 104 can include laptops, desktops, tablets, mobile phones such as smartphones, video game consoles, Internet-enabled televisions, etc. The distinction between the sender clients 102 and the recipient clients 104 of FIG. 1 is to simplify discussion in the remainder of this disclosure. In general, there is no inherent difference between the sender clients 102 and the recipient clients 104. Thus, a sender client 102 can also be a recipient client 104 and vice versa.

A user of the sender clients 102 can send an electronic communication, such as an email, to a user of a recipient client 104 via the communication system 120. The communication system 120, which can include a prioritized communication system as described above, can include any system that can be configured to process email and to present priority email, or email received from a buddy, friend, or approved contact, to a user. The buddy, friend, priority contact, or approved contact can be, for example, a second user who is associated with the first user in a database associated with the communication system. In some embodiments, the buddy can have emails sent by the buddy given priority access to the inbox of their associated users. Having priority access to the inbox can include, in some cases, being placed in a priority inbox that includes emails with priority access, but not email without priority access. Further, the communication system 120 can include any system that can be configured to separate email that is not priority email, or not received from an approved contact or buddy, into a non-priority or lower priority location, such as a non-priority inbox.

The communication system 120 can include a number of systems that facilitate prioritizing electronic communications. For example, the communication system can include a user association module 122, a signature module 124, a communication director 126, a certification module 128, a video chat module 130, a calendar module 132, a video mail module 134, an instant messaging module 136, and an email module 138.

A user can select a contact to be a buddy or approved contact via the communication system 120. The communication system 120 can use the user association module 122 to associate the user with the buddy and to invite the contact to confirm the user as a buddy. If the contact confirms the user as a buddy, the user association module 122 can provide one or more public keys of the user to the buddy. In some embodiments, multiple public keys, such as two, three, or more, are provided to the buddy. In some cases, the security of the communication system 120 is improved by using more than one set of public/private keys. For convenience, unless stated otherwise, the remainder of this disclosure will generally be described using a pair of public/private key pairs. Thus, in the case of the communication system 120 being configured to use dual public/private key pairs, if the contact confirms the user as a buddy, the user association module 122 can provide the user's public key pairs to the buddy. Further, the user association module 122 can associate a public key pair of the buddy with the user. The association between the user and buddy as well as the association of the public keys between the user and the buddy can be stored in a memory or data store of the communication system 120 or in a database 140 associated with the communication system 120. In some cases, the database 140 can be part of the communication system 120. Alternatively, as illustrated in FIG. 1, the database 140 can be a separate system that is in communication with the communication system 120.

A user of the sender client 102 can use the communication system 120 to send an email to a user of a recipient system 104 via the email module 138. Upon the user of the sender client 102 instructing the communication system 120 to send the email, the user association module 122 can determine if the recipient of the email is a buddy of the sender. If so, the signature module 124 can create a pair of signatures using the private key pairs of the sender. These signatures can be included with the email when it is sent by the email module 138 to the user of the recipient system 104. The signature module 124 can include any system that can generate any number and type of signatures. These signatures can be based on an electronic communication, or a part of the electronic communication. For example, the signature can be based on an email header, a body of the email, an attachment included with an email, etc. Further, the signature can be generated using any type of asymmetric key. In some cases, a symmetric key can be used to generate the signature.

The communication director 126 can send or direct the email with the signatures to a user associated with the recipient client 104. The communication director 126 can include any system that can send and receive emails, with or without signatures.

Upon the communication director 126 receiving an email intended for a user of a recipient client 104, the communication director 126 can identify the sender of the email and using the user association module 122 determine whether the sender and the user are buddies or approved contacts of each other. If the sender and recipient user are buddies, the signature module 124, using the public key pairs associated with the sender and accessible by the recipient user, can verify the signature pairs associated with the email. The communication director 126 can direct the email based on whether the email includes signatures and whether the signature module 124 successfully verifies the signatures. Emails with successfully verified signatures can be directed to a priority inbox of the user. Emails without successfully verified signatures can be directed elsewhere.

The communication system 120 can send emails to remote email servers 110 and receive emails from remote email servers 110. The remote email servers 110 can include any email or communication system that is associated with an organization or entity other than the organization or entity that is associated with the communication system 120. For example, the remote email servers 110 can include Yahoo's email system. In some cases, the remote email servers 110 can include an implementation of the communication system 120.

The communication system 120, the sender clients 102, the recipient clients 104, and the remote email servers 110, can each communicate with one another via the network 106. The network 106 can include any type of network that enables two computing systems to communicate with each other. For example, the network 106 can include a LAN, a WAN, a cellular or mobile phone network, a wireless network, a wired network, an ad hoc network, combinations of the same, or the like. Further, the network can be homogenous or heterogeneous. In some cases, the network 106 can include the Internet.

In addition to processing emails based on priority, the communication system can provide additional communication services. For example, the communication system 120 includes a certification module 128, which can be used to certify an email between a pair of users. The certification email 128 can include any system that can assign a unique public/private key pair between the pair of users and that can use the private key to encrypt some or all of the communication including, in some cases, attachments included with an email.

Further, the communication system 120 can enable users who are buddies or approved contacts of each other to use video chat to communicate with each other via the video chat module 130, send video emails to each other via the video mail module 134, and to instant message or text each other via the instant messaging module 136.

In addition, users can maintain calendars via the calendar module 132. In some cases, users can send calendar appointments to other users. Appointments received from buddies can be highlighted or entered into the calendar in a different color thereby enabling a user to more easily identify appointments with approved contacts.

The various systems illustrated as part of the communication system 120 can be distributed across multiple computing systems, or combined into a single computing system. Further, one or more of the systems may be combined into fewer systems. For example, the email module 138 and the communication director 126 may be combined into a single system.

Example of a Buddy Addition Process

Figure 2:
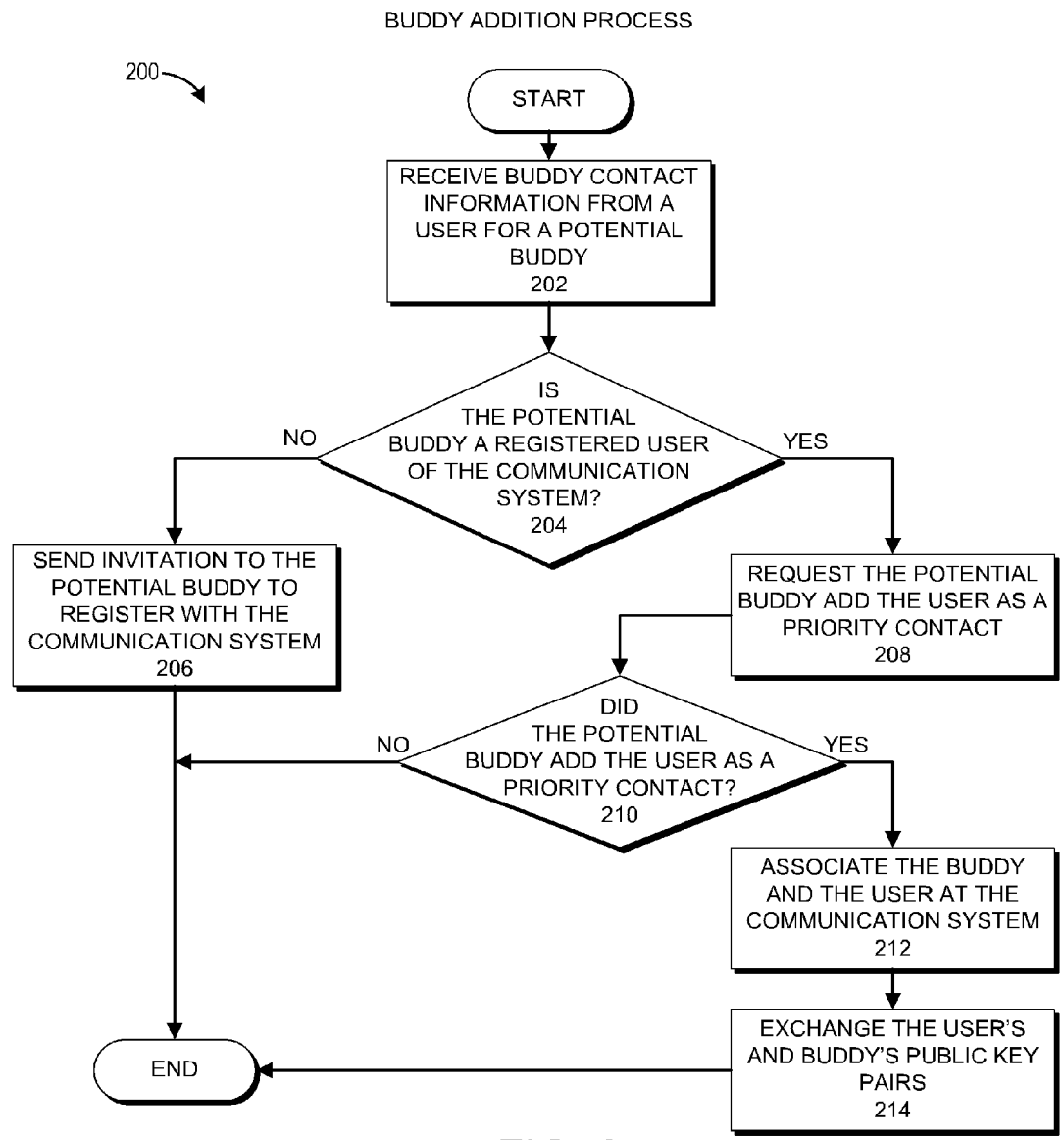
FIG. 2 illustrates a flowchart of an embodiment of a buddy addition process.

FIG. 2 depicts a flowchart of an example of a buddy, or approved contact, addition process 200. The process 200 can be implemented, at least in part, by any system that can associate one user with a second user thereby enabling a communication system to prioritize communications between the two users. For example, the process 200, in whole or in part, can be implemented by the communication system 120, the user association module 122, the email module 138, and the communication director 126, to name a few. Although any number of systems, in whole or in part, can implement the process 200, to simplify discussion, portions of the process 200 will be described with reference to particular systems.

Process 200 is described with respect to a user and a buddy or potential buddy. In many cases, the user and the buddy are human users. However, in some cases, one or both of the user and the buddy may be non-human users. For example, one or both of the user and the buddy may be an electronic system, an automated system, a software application, an organization, or any other system or entity that can have an email address. In some cases, the user and/or buddy may be using an email account associated with an entity or organization that may or may not be exclusively accessed by a single user. For example, the email account may be a technical support email account that may be accessible by multiple employees of the organization that owns the technical support email account.

The process 200 begins at block 202 where, for example, the communication system 120 receives buddy contact information from a user for a potential buddy. The potential buddy can include any other user whose communications the user wants to appear in a priority inbox. The buddy contact information is associated with a potential buddy or approved contact and can include any information that facilitates the communication system 120 identifying a user and that enables the communication system 120 to provide or direct electronic communication between the user and the buddy. For example, the buddy contact information can include a name, an email address, one or more alternative email addresses, one or more phone numbers, one or more screen names (e.g., video chat screen names, instant messaging screen names, etc.), and one or more user aliases, to name a few.

At decision block 204, the user association module 122, for example, determines if the potential buddy is a registered user of the communication system 120. This determination can include determining if the potential buddy has an account with the communication system 120. If the potential buddy is not a registered user of the communication system 120, the communication system 120 sends an invitation to the potential buddy to register with the communication system at block 206. This invitation can be provided to the buddy using one or more communication methods selected based on the buddy contact information received at the block 202. For example, if the buddy contact information includes alternative email addresses, the invitation can be emailed to the potential buddy via one of the alternative email addresses. Similarly, if a mobile phone number for the potential buddy has been provided, the invitation can be sent to the potential buddy via a text message. Further, in some cases, the invitation may be sent to a user associated with the potential buddy, which may occur when the potential buddy is an organization or business entity.

If the potential buddy is a registered user of the communication system 120, the user association module 122 requests that the potential buddy add the user as a priority contact. Requesting that the potential buddy add the user as a priority contact can include causing a message to be presented to the potential user. This message can identify the user requesting that the potential buddy become an approved contact of the user and can provide the potential buddy with a method to accept or reject the request, such as clickable graphical user interface (GUI) buttons or other user interface controls.

At decision block 210, the user association module 122 determines whether the potential buddy added the user as a priority contact, or a buddy. If not, the user association module 122 may optionally inform the user that the request to add the potential buddy as a contact was rejected. Alternatively, the user association module 122 may do nothing thereby preventing, in some cases, a malicious user from confirming a valid email address based on whether a buddy request was rejected versus an email address that ignored the requester or was not a valid email address.

If the user association module 122 determines that the potential buddy added the user as a priority contact at decision block 210, the user association module associates the buddy and the user with each other at the communication system 120 at block 212. Associating the buddy and the user with each other can include specifying the buddy in a list, table, or other data structure of buddies or approved contacts associated with the user and vice versa. In some cases, associating the user and the buddy with each other includes associating the user and the buddy with each other in the database 140.

At block 214, the user association module 122 exchanges the user's and buddy's public key pairs. Exchanging the public key pairs can include providing the user with access to the buddy's pair of public keys and vice versa. Further, providing the user with access to the buddy's pair of public keys can include associating the buddy's public key pairs with the user in the list or other data structure used to associate the buddy with the user. In some cases, a copy of each of the buddy's public key pairs may be stored in the data structure or in an entry of the database 140 associated with the user or the user's list of buddies. Each of the public keys is associated with corresponding private keys that are not exchanged between the buddy and the user in certain embodiments. In some cases, a greater or lesser number of public keys may be exchanged between the user and the buddy. For example, there could be one, three, four, or more public keys exchanged between the user and the buddy. Further, the keys are typically exchanged between communication system 120 accounts associated with the user and the buddy. Thus, in some cases, the user and the buddy may not be aware of the key exchange that occurs when the buddy accepts the user's buddy request. Advantageously, the exchange of the key pairs can therefore occur transparently to or be hidden from the users, thereby enabling the users to avoid having to manage key pairs. As a result, ease of use for users of the communication system 120 can be improved over existing communication systems that require users to explicitly select keys to encrypt email. Further, in certain embodiments, the security benefits are increased by using multiple public/private key pairs because a malicious user needs to obtain access to more than one private key to mimic the email sender. In some cases, the block 214 may be optional.

In some cases, the buddy may initiate the request for the user and the buddy to become approved contacts whose communications appear is each other's priority inbox. In such cases, the process 200 may be performed with the buddy serving as the user and the user serving as the potential buddy.

Example Process for Sending Priority Email

Figure 3:
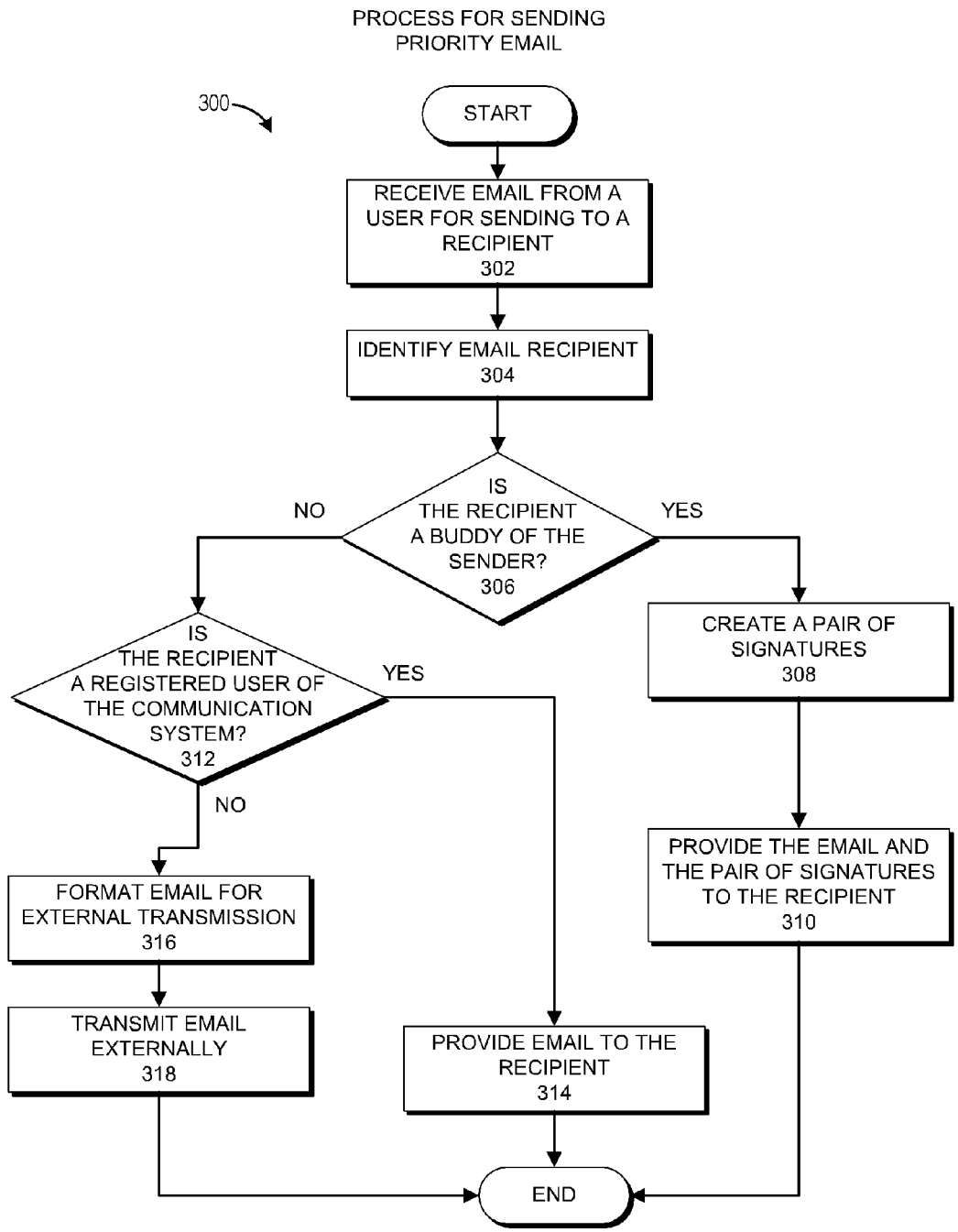
FIG. 3 illustrates a flowchart of an embodiment of a process for sending priority email.

FIG. 3 presents a flowchart of an example of a process 300 for sending priority email. The process 300 can be implemented, at least in part, by any system that can send priority email from a user to a recipient. Generally, the system can send non-priority email, or email associated with a different priority level than the priority email, in addition to the priority email. For example, the process 300, in whole or in part, can be implemented by the communication system 120, the user association module 122, the email module 138, the signature module 124, and the communication director 126, to name a few. Although any number of systems, in whole or in part, can implement the process 300, to simplify discussion, portions of the process 300 will be described with reference to particular systems.

The process 300 is described with respect to a user, or sender, and a recipient. In some cases, similar to the process 200, one or both of the user and the recipient of the process 300 may be either human or non-human users.

The process 300 begins at block 302 where, for example, the email module 138 receives an email from a user, or sender, for sending to a recipient. This email may be received via a webmail interface, an email client (e.g., Outlook®, Eudora®, Thunderbird®, etc.), or any type of application specific interface that can be provided by the communication system 120 for creating an email that can be provided to the email module 138. Further, in some cases, the email client may include a software plug-in that facilitates performing the process 300. In certain cases, the email may or may not follow the Simple Mail Transfer Protocol (SMTP) format, or other standardized communication formats.

At block 304, the email module 138 identifies the email recipient to whom the email is addressed. In some cases, the email may be addressed to multiple recipients. In such cases, the remainder of the process 300 may be repeated for each recipient in a serial, parallel, or partially parallel manner. To simplify discussion, and not to limit this disclosure, the rest of the process 300 will be described with respect to a single recipient.

At decision block 306, the user association module 122 determines whether the recipient is a buddy of the sender, or the user who provided the email at the block 302. To determine whether the recipient is a buddy of the sender, the user association module can access a data structure associated with the sender that includes the identity of the sender's buddies. This data structure may be stored at the communication system 120 or at the database 140.

If the user association module 122 determines that the recipient is a buddy of the sender, the signature module 124 creates a pair of signatures based on the email and a pair of private keys associated with the sender at block 308. In the case where the recipient is a buddy of the sender, the recipient, or an email system associated with the recipient's email address, can access a pair of public keys corresponding to the pair of private keys used to create the signatures. In some embodiments, users may or may not be aware of the existence of the keys or the signature process. Further, in some cases, users may not access public or private keys, but the communication system 120 or other communication systems associated with the senders or recipients may access the keys on behalf of the users.

One non-limiting example of a process that can be used to create the signatures is as follows. The signature module 124 can hash at least some of the header of the email using a hashing function. Then, the hash of the header can be encrypted using one of the private keys from the pair of private keys associated with the user sending the email. This signature can then be included with the header of the email. The signature module 124 can repeat this process to hash at least some of the email body using the second private key from the pair of private keys. In some cases, the same hashing function may be used for each signature. In other cases, each signature may be based on a different hashing function. The second signature can then be included with the email body. In some cases, one of the two signatures can be based, at least in part, on a hash of attachments included with the email. In some embodiments, the hashing function used to create each signature is predetermined and both the system creating the signature and the system verifying the signature are aware of the hash function. In other cases, the signature module 124 may select a hash function when creating the signature. In such cases, the signature can include information to facilitate the system receiving the email determining which hash function was used to create the signature. Further, in some cases, the signature may include information to facilitate the system receiving the email determining which public key of the public keys provided by the sender should be used to decrypt the signature to obtain the hash.

In some cases, the signature module 124 may create a single signature using a single private key. In other cases, more than two signatures may be created using a corresponding number of private keys associated with the email sender.

At block 310, the communication director 126 provides the email and the pair of signatures to the recipient. In some embodiments, providing the email to the recipient can include storing the email and the pairs of signatures in a location in the database 140 associated with an email account of the recipient provided by the communication system 120 thereby enabling the communication system 120 to present the email to the recipient when the recipient accesses the email account. Alternatively, the email and signatures may be stored in a non-user specific entry of the database 140 and the entry can then be associated with the email account of the recipient. In other embodiments, providing the email to the recipient can include sending the email and the pair of signatures to an email account of the recipient provided by one of the remote email servers 110. In some cases, the sender and/or recipient may not be aware of the signatures as the signatures may be processed automatically by the communication system 120 and the communication system associated with the recipient, which in some cases is also the communication system 120.

In some embodiments, the blocks 308 and 310 can be optional. In such embodiments, the email may be stored in the database 140 and associated with the recipient without signatures. Further, in some cases, a priority indicator may be associated with the email indicating that the email is from a buddy of the recipient thereby enabling the communication system 120 to present the email in a priority inbox of the recipient when the recipient accesses the recipient's email account.

If the user association module 122 determines at the decision block 306 that the recipient is not a buddy of the sender, the communication system 120 determines whether the recipient is a registered user of the communication system 120 at decision block 312. Determining if the recipient is a registered user of the communication system 120 includes determining whether the recipient email address associated with the recipient is an email address provided and supported by the communication system 120 or an entity associated with the communication system 120. In some cases, a recipient may be registered with the communication system 120, or the associated entity thereof, but the email address used by the sender may not be the email address provided by the communication system 120 to the recipient because, for example, the recipient may have email addresses associated with multiple email providers. In such cases, if the email address of the recipient is not the email address provided by the communication system 120, or the associated entity thereof, then the email is processed as if the recipient is not registered with the communication system 120. Alternatively, in some cases, the communication system 120 can substitute the recipient email address used by the sender with the email address of the recipient that is provided by the communication system 120, if such an email address exists for the recipient.

If the recipient is a registered user of the communication system 120, the communication director 126 provides the email to the recipient at block 314. In some embodiments, providing the email to the recipient can include storing the email in a location in the database 140 associated with an email account of the recipient provided by the communication system 120 thereby enabling the communication system 120 to present the recipient with the email in response to the recipient requesting access to non-priority email. In some cases, the email may be marked or identified in the database 140 as a non-priority email.

If the recipient is not a registered user of the communication system 120, the email module 138 formats the email for external transmission at block 316. For example, assuming the email received at the block 320 was not in SMTP format, the email module 138 may reformat the email to satisfy the SMTP standard for electronic email. In some embodiments, the block 316 may be optional, such as in cases where the email is received in a standard format (e.g., SMTP, or extended SMTP (ESMTP)).

At block 318, the email is transmitted externally. In some cases, transmitting the email externally includes transmitting the email to an email server that is owned and/or operated by an entity other than the entity that owns and/or operates the communication system 120. For example, transmitting the email externally may include transmitting the email to one or more of the remote email servers 110 or any other email system associated with the recipient's email address that is not owned and/or operated by the owner and/or operator of the communication system 120.

Example of a Process for Receiving Priority Email

Figure 4:
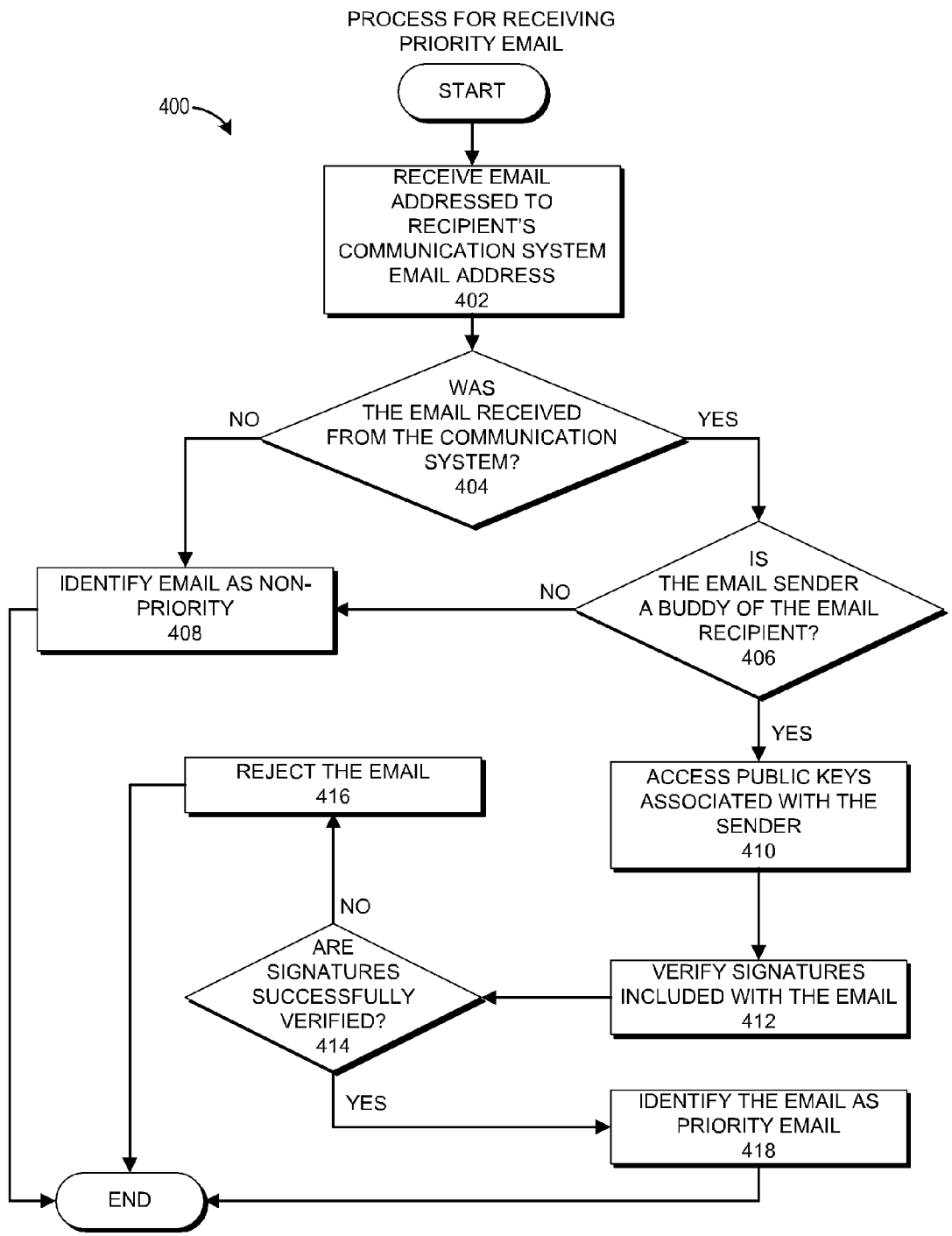
FIG. 4 illustrates a flowchart of an embodiment of a process for receiving priority email.

FIG. 4 presents a flowchart of an example of a process 400 for receiving priority email. The process 400 can be implemented, at least in part, by any system that can receive and process priority email addressed to a recipient user from a sender. Generally, the system can receive and process non-priority email, or email associated with a different priority level than the priority email, in addition to the priority email. For example, the process 400, in whole or in part, can be implemented by the communication system 120, the user association module 122, the email module 138, the signature module 124, and the communication director 126, to name a few. Although any number of systems, in whole or in part, can implement the process 400, to simplify discussion, portions of the process 400 will be described with reference to particular systems.

The process 400 is described with respect to a recipient user, or recipient, and a sender. In some cases, similar to the process 200 and the process 300, one or both of the recipient and the sender of the process 400 may be either human or non-human users.

The process 400 begins at block 402 where, for example, the email module 138 receives an email addressed to a recipient's email address provided by the communication system 120 or an associated entity thereof. At decision block 404, the email module 138 determines whether the email was received from the communication system 120, or, in some cases, from another communication system associated with the entity that operates the communication system 120.

If the email was received from the communication system 120, or from another communication system associated with the entity that operates the communication system 120, the user association module 122 determines whether the email sender is a buddy of the email recipient, or the recipient associated with the recipient email address at decision block 406. Determining whether the email sender is a buddy of the email recipient can include accessing a data structure, such as a database table or a list, associated with the email recipient that includes the buddies of the email recipient and determining whether the sender is identified in the data structure as a buddy of the recipient.

If the email was not received from the communication system 120 or if the email sender is not a buddy of the email recipient, the email module 138 identifies the email as a non-priority email at the block 408. Identifying the email as non-priority can include storing an indicator with the email at, for example, the database 140 that indicates that the email is non-priority. The communication system 120 can use the indicator to determine that the email, or a link to the email, should be placed in a non-priority folder, or lobby, when the recipient accesses the communication system 120. Alternatively, the indicator may identify a priority level and the email module 138 may store the email along with an indicator value identifying the email with a priority level that is lower than a priority level associated with a priority email, or an email received from a sender who is a buddy of the recipient. The communication system 120 can use the indicator to determine that the email, or a link to the email, should be placed in a non-priority folder, or lobby, when the recipient accesses the communication system 120.

If the email sender is a buddy of the email recipient, the signature module 124 accesses public keys associated with the sender at block 410. In certain embodiments, if the sender is a buddy of the recipient and the email is received from a communication system 120, the email includes one or more signatures (e.g., a pair of signatures) that were created using in part private keys associated with the sender and corresponding to the public keys accessed at the block 410. However, in some embodiments, the email may not include signatures. In such embodiments, the block 410, as well as the blocks 412 and 416 and the decision block 414 that are described further below, may be optional. Accessing the public keys at the block 410 may include accessing the data structure described above at decision block 406. This data structure may include the public keys associated with each buddy of the recipient. Further, the number of public keys accessed can include any number of public keys associated with the sender and the number of public keys may correspond to the number of signatures included with the email.

At block 412, the signature module 124 verifies the signatures included with the email. Verifying the signatures may depend on the process used to create the signatures. One non-limiting example of a process to verify the signatures included with the email that corresponds to the example process for creating signatures discussed with respect to the process 300 is as follows. For each included signature, the signature module 124 can identify a portion of the email used to create the signature (e.g., the email header, the email body, email attachments, etc.). Using a hash function, the signature module 124 creates a hash of the portion of the email used to create the signature. The signature module 124 also decrypts the signature using a public key of the email sender that corresponds to a private key associated with the email sender to obtain a second hash. The two hashes are compared and if the hashes are equal the signature is verified as valid. In some cases, the signature module 124 is preconfigured with the hash function used to create the signature. In other cases, the signature module 124 may identify the hash function to use to verify the signature based on information included with the signature.

At decision block 414, the signature module 124 determines whether the one or more signatures included with the email were successfully verified. If the signatures were not successfully verified (e.g., the hash of one of the signatures did not match a corresponding hash created by the signature module 124, or the signature module 124 was unable to access a public key corresponding to the private key used to create the signature), the communication system 120 rejects the email at block 416. Rejecting the email can include discarding the email and/or informing one or more of the sender and recipient of the rejected email. In some cases, an email allegedly received from a buddy of the recipient that includes signatures that are not successfully verified may indicate that the email is from a sender who spoofed the alleged sender's email account. Advantageously, in certain embodiments, by rejecting an email whose signature is not verified, email from malicious users is blocked. In some embodiments, instead of or in addition to rejecting the email, the email may be placed in a non-priority email folder.

If the one or more signatures are successfully verified at decision block 414, the communication director 126 identifies the email as priority email at block 418. Identifying the email as priority email may include associating the email with a priority level that is greater than non-priority email at the database 140 thereby enabling the communication system 120 to present the email to the recipient in a priority inbox when the recipient accesses the recipient's email account at the communication system 120.

As previously mentioned, in some embodiments the one or more signatures included with the email may be optional. In such embodiments, the communication director 126 may associate the email with a priority level that is greater than the non-priority email at the database 140 in response to the user association module 122 determining that the email sender is a buddy of the email recipient at the decision block 406.

In some embodiments, different buddies of a user may be associated with different priority level. Emails from buddies associated with certain priority levels may be identified as priority email, which can then be placed in the user's priority inbox upon the user accessing the communication system 120. Emails from buddies with other priority levels may be placed in alternative folders form the priority inbox that are separate from the folder for non-priority emails, such as emails received from unknown contacts or unapproved contacts.

Example Process for Accessing Email

Figure 5:
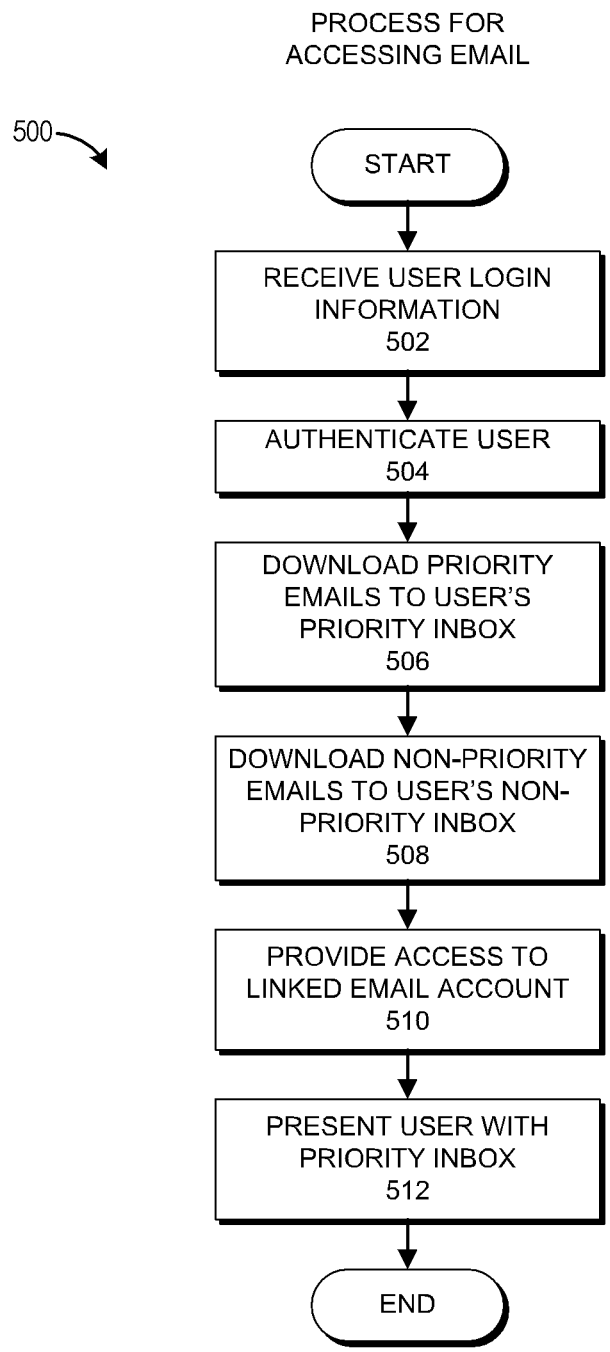
FIG. 5 illustrates a flowchart of an embodiment of a process for accessing email.

FIG. 5 presents a flowchart of an example of a process 500 for accessing email. The process 500 can be implemented, at least in part, by any system that can provide a user with access to priority email addressed to an email account that the user is authorized to access. This email account may be the user's email account or it may be a shared email account that the user is authorized to access. Generally, the system can enable the user to access both priority email and non-priority email, or email associated with a different priority level than the priority email. For example, the process 500, in whole or in part, can be implemented by the communication system 120, the user association module 122, the email module 138, the signature module 124, and the communication director 126, to name a few. Although any number of systems, in whole or in part, can implement the process 500, to simplify discussion, portions of the process 500 will be described with reference to particular systems.

The process 500 is described with respect to a user. In some cases, similar to the process 200, the process 300, and the process 400, the user may be either a human or a non-human user, such as an automated system.

The process 500 begins at block 502 where, for example, the email module 138 receives user login information for an email account associated with a user. This email account may be provided and/or managed by the communication system 120, or an associated entity thereof. Further, the login information may include any type of login information. For example, the login information may include a username, email address, password, biometric input (e.g., fingerprint, eye-scan, etc.), image selection, etc. At block 504, the communication system 120 authenticates the user based, at least in part, on the user login information. If the user is unsuccessfully authenticated, the process 500 may end or may request the user attempt to authenticate again.

At block 506, the communication director 126 downloads priority emails to the user's priority inbox. In some cases, downloading the priority emails may include providing the user with access to the priority emails via the priority inbox. In some cases, the priority emails are accessed directly from the database 140. A link may be placed in the priority inbox for each email and the email may be downloaded and presented to the user upon the user selecting the link. In other cases, a copy of the priority emails are downloaded to a storage location in the communication system 120 upon the user logging into the user's email account. Advantageously, in certain embodiments, by downloading the emails to another storage location, the email may be accessed faster than accessing the email directly from the database 140. The storage location may be a temporary storage location that is allocated to the user upon the user accessing the user's email account with the communication system 120. In some embodiments, the email may be downloaded to the client with which the user is accessing the communication system 120 thereby further increasing the access speed of the email compared to accessing the email on the communication system 120 or the database 140. In other cases, each email is individually downloaded upon the user selecting a link associated with the email from the priority inbox.

At block 508, the communication director 126 downloads the non-priority emails, or emails associated with a different priority level than the priority level of the priority emails, to the user's non-priority inbox. In some embodiments, block 508 can include one or more of the embodiments described above with respect to the block 506, but with the non-priority emails being downloaded or included as links in a non-priority inbox or folder.

At block 510, the email module 138 provides the user with access to one or more linked email accounts. Generally, the one or more linked email accounts include email accounts provided by the remote email servers 110 or associated entities thereof. The email module 138 may access the linked email accounts using login and/or access information provided by the user to link the accounts with the email account provided by the communication system 120 or associated entity thereof. In some embodiments, the block 510 is optional.

At block 512, the email module 138 presents the priority inbox to the user. In some embodiments, the non-priority inbox or folder and the one or more linked email account inboxes or folders may be accessed by the user in response to a request to access the non-priority inbox and/or the one or more linked email account inboxes, but these inboxes are not presented to the user by default. Advantageously, in certain embodiments, by presenting the email with the priority inbox, the problems of spam and clutter that plague prior-art email systems is reduced or eliminated. Further, by giving the user access to non-priority emails in a separate location, email is not lost. In addition, in some embodiments, resources spent on identifying new ways to block spam each time a spam blocker is circumvented can be reduced or eliminated because spam is not blocked, but is instead allowed into the communication system 120 and then directed into a non-priority inbox instead of the user's priority inbox.

In some embodiments, the process 400 may be performed as part of the block 506 regardless of when the email was received. However, generally, the process 400 is performed upon receipt of an email. Advantageously, in certain embodiments, by performing the process 400 upon receipt of the email, changing the key pairs of the email sender generally will not interfere with accessing email that was sent with signatures created using the previous key pairs when the email is accessed after the sender's keys are changed because the signatures will typically have been verified.

Example Certified Email Process

Figure 6:
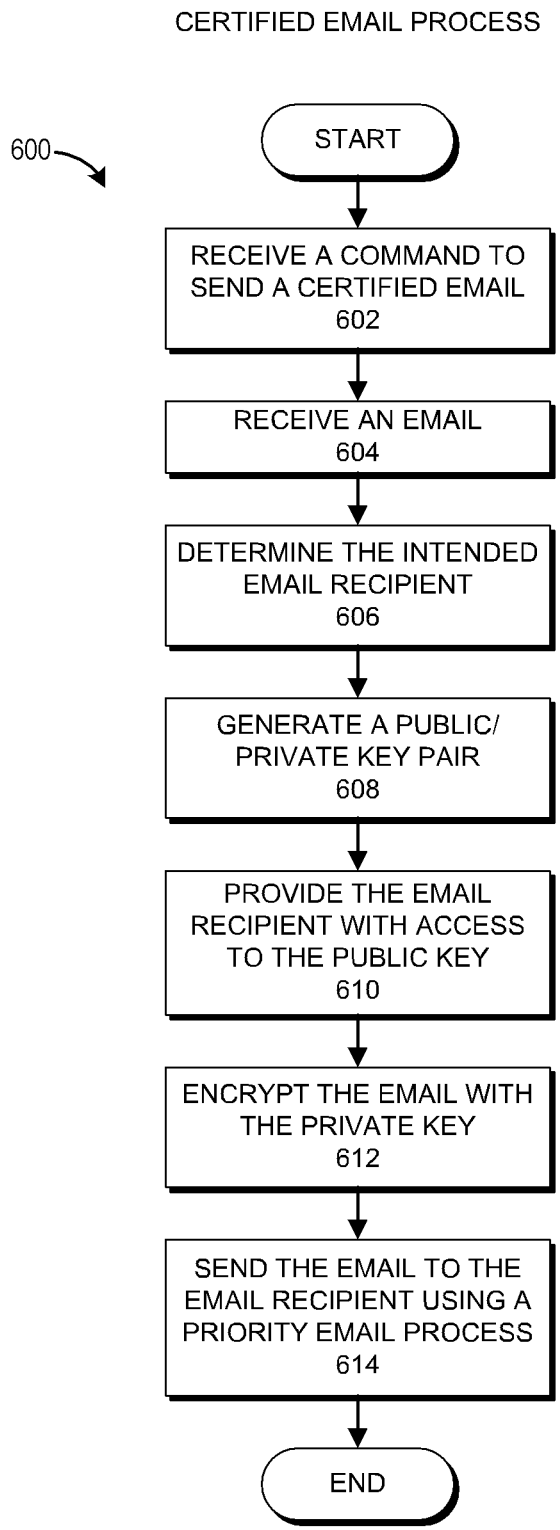
FIG. 6 illustrates a flowchart of an embodiment of a certified email process.

FIG. 6 presents a flowchart of an example of a certified email process 600. The process 600 can be implemented, at least in part, by any system that can certify an email by encrypting the email with a private key associated with the email sender and can provide a corresponding public key to the email recipient thereby enabling the recipient to decrypt the email with the sender's public key. For example, the process 600, in whole or in part, can be implemented by the communication system 120, the user association module 122, the email module 138, the signature module 124, the certification module 128, and the communication director 126, to name a few. Although any number of systems, in whole or in part, can implement the process 600, to simplify discussion, portions of the process 600 will be described with reference to particular systems.

The process 600 is described with respect to a sender user and a recipient user. In some cases, similar to the process 200, the process 300, the process 400, and the process 500, one or both of the sender and the recipient of the process 600 may be non-human users.

The process 600 begins at block 602 where, for example, the email module 138 receives a command to send a certified email from a user or email sender. At block 604, the email module 138 receives an email from the sender that has been selected to be sent as a certified email. At block 606, the email module 138 determines the intended email recipient for the certified email. In some embodiments, the recipient is a buddy of the sender. In such cases, the process 600 may include performing the process 300 to generate signatures to include with the email. In other embodiments, the recipient may be either a buddy or not a buddy.

At block 608, the certification module 128 generates a public/private key pair. In some embodiments, the public/private key pair may be specific to the sender and the recipient. Thus, in such embodiments, the certification module 128 may use the private key only to encrypt emails sent from the sender to the recipient and certified emails sent by the sender to other recipients require a different public/private key pair. In other embodiments, the public/private key pair may be specific to the email being certified. Thus, in such cases, if the sender attempts to send a second certified email to the recipient, a different public/private key pair may be used.

In some cases, the certified email may have multiple recipients. In such cases, the certification module 128 may generate a different public/private key pair for each recipient and a copy of the email can be encrypted for each recipient using the private key corresponding to the public key provided to the recipient. The different public/private key pairs can be specific to each recipient paired with the sender and can be reused for other certified emails sent by the sender to the recipient. Alternatively, the public/private key pair may be specific to the recipient paired with the sender and the email. Thus, sending a new certified email may entail using a new public/private key pair. As another alternative, a public/private key pair can be specific to an email regardless of the number recipients. Thus, in such cases, the public/private key pair can be used for multiple recipients of a certified email, but cannot be repeated for a new email. Further, as private keys are not exchanged between users, if the recipient sends a reply email or a new email back to the sender using the process 600, a new public/private key pair is generated with the recipient using the private key to encrypt the email and the sender receiving access to a corresponding public key.

At block 610, the certification module 128 provides the email recipient with access to the public key from the public/private key pair generated at the block 608. In cases where the email is addressed to multiple recipients and multiple public/private key pairs are generated, one for each recipient paired with the sender, the certification module 128 provides each email recipient with access to the public key from the public/private key pair associated with the recipient. In some embodiments, providing a recipient with access to the public key includes sending the public key to the recipient. The key may be sent over a secure channel. In some embodiments, providing the recipient with access to the public key may include providing an email account of the recipient with access to the public key thereby enabling the communication system 120 the ability to use the public key, whether or not the recipient is aware of the key exchange and use of the keys. Further, in some cases, providing the recipient with access to the public key may include storing the public key at the database 140 and associating the recipient with the public key at the database 140.

At block 612, the certification module 128 encrypts the email with the private key. In cases where the email is sent to multiple recipients and a public/private key pair is associated with each recipient paired with the sender, a copy of the email for each recipient is encrypted using the private key corresponding to the public key for the recipient. In some embodiments, encrypting the email can include encrypting any attachments that may be included with the email.

At block 614, the communication director 126 sends the email to the email recipient using a priority email process, such as the process 300. In some cases, the encryption performed at the block 612 may occur after the signatures are created in embodiments of the process 300. In some such cases, the signatures may be encrypted with the certified email at the block 612. In other cases, the signatures may be excluded from the encryption process of the block 612. In some embodiments, the email may be sent to the email recipient without using a priority email process.

In certain embodiments, the certified email may be received using a process for receiving priority email, such as the process 400. In such embodiments, the process for receiving priority email can include identifying a public key accessible to the recipient that is associated with one or more of the received email and the email sender. If the public key is identified, the process 400 can use this public key to decrypt the certified email. In some cases, identifying the public key and decrypting the certified email can occur as part of the process for verifying the signatures included with the email, such as at block 412. Advantageously, in certain embodiments, by successfully decrypting the certified email using the public key provided by the alleged sender of the email, the recipient can be assured that the email is from the alleged sender and not a malicious user masquerading as the alleged sender. A further advantage of using the process 600, in certain embodiments, is that the recipient can be assured that the email has not been modified in transit and that the email received is the same as was sent by the sender. In embodiments that do not use a priority email process to send the certified email, either a process for receiving priority email or any other process that enables decryption and verification of the certified email can be used to receive the email.

In addition, in certain embodiments, the process 500, or any other process for accessing email at an email provider can be used to access the certified email once it has been decrypted. In some cases, the certified email may be decrypted as part of the process 500. For example, the email may be decrypted as part of the block 506 or 508.

Example Non-Email Communication Process

Figure 7:
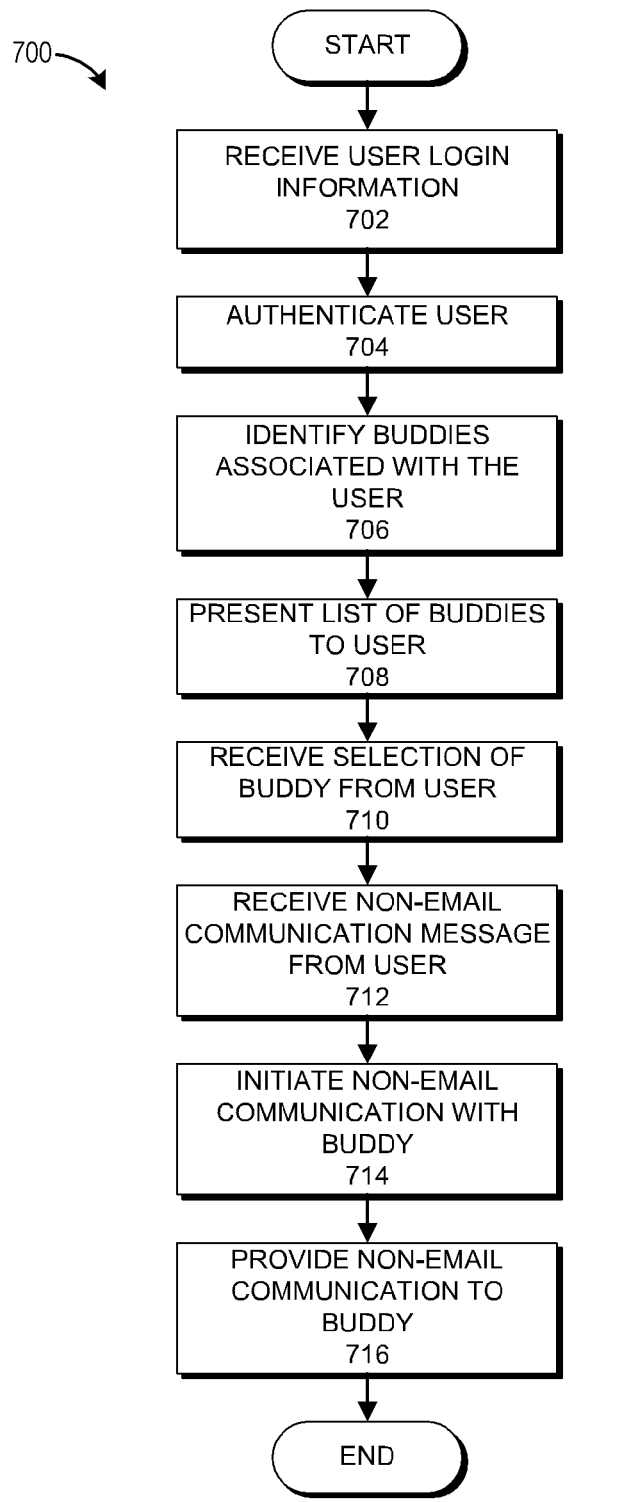
FIG. 7 illustrates a flowchart of an embodiment of a non-email communication process.

FIG. 7 presents a flowchart of an example of a non-email communication process 700. The process 700 can be implemented, at least in part, by any system that can present a user with one or more buddies with which to engage in non-email communication and that can perform or facilitate the non-email communication. For example, the process 700, in whole or in part, can be implemented by the communication system 120, the user association module 122, the signature module 124, the communication director 126, the video chat module 130, the video email module 134, and the instant messaging module 136, to name a few. Although any number of systems, in whole or in part, can implement the process 700, to simplify discussion, portions of the process 700 will be described with reference to particular systems.

The process 700 is described with respect to a user and one or more buddies' of the user. In some cases, similar to the process 200, the process 300, the process 400, the process 500, and the process 600, one or more of the user and the user's buddies may be non-human users. Further, although the process 700 is primarily described with respect to performing non-email communication, in some embodiments the process 700 can be used to initiate email communication and may be used in conjunction with an email process, such as the process 300.

The process 700 begins at block 702 where, for example, the communication system 120 receives user login information for an electronic communication account associated with a user. This account may be provided and/or managed by the communication system 120, or an associated entity thereof. Further, the login information may include any type of login information. For example, the login information may include a username, email address, password, biometric input (e.g., fingerprint, eye-scan, etc.), image selection, etc. At block 704, the communication system 120 authenticates the user based, at least in part, on the user login information. If the user is unsuccessfully authenticated, the process 700 may end or may request the user attempt to authenticate again.

At block 706, the user association module 122 identifies buddies associated with the user. These buddies may be identified based on users how have shared their public keys with the user who logged in to the communication system 120. Alternatively, or in addition, the buddies may be identified based on an association between the buddies and user in a data store, such as the database 140. In some embodiments, the user association module 122 identifies the buddies who are online, or are accessing the communication system 120, at the same time as the user. The process associated with the block 706 may be repeated continuously, at predetermined intervals, or in response to a buddy associated with the user logging in to, logging out of, or disconnecting from the communication system 120.

At block 708, the communication system 120 presents a list or provides an indication of the buddies to the user. In some cases, the block 708 may include buddies who are presently online. In other cases, all buddies of the user may be presented and an indicator may be used to identity the buddies who are online versus those who are not online. In some cases, the block 708 may be performed in response to an action by the user, such as clicking on a button configured to present the buddy list or to initiate a communication option, such as instant messaging, text-messaging, or sending an email.

At block 710, the communication system 120 receives a selection of a buddy from the user. In some cases, the communication system 120 may receive a selection of multiple buddies at the block 710. At block 712, the communication system 120 receives a non-email communication message from the user. Receiving the non-email communication message can include receiving a selection of a non-email communication option from the user. For example, the communication system 120 may receive an indication from the user that the user desires to send an instant message to the selected buddy. In some embodiments, the communication system 120 may receive an email message at the block 712. Using an email process, such as the process 300, the communication system 120 can send the email message to the buddy selected by the user at the block 710.

At block 714, the communication system 120 can initiate non-email communication with the buddy using a communication module, such as the video chat module 130, the video email module 134, and the instant messaging module 136. Initiating the non-email communication can include inviting the buddy to communicate via the communication medium selected by the user. For example, initiating the non-email communication medium can include inviting the buddy to video chat.

At block 716, the communication system 120 using a communication module can provide the non-email communication to the buddy. In some cases, the non-email communication may be provided in response to the buddy accepting an invitation to communicate. In cases where multiple buddies are selected at the block 710, the message received at the block 712 can be provided to multiple buddies. Advantageously, in some embodiments, the user can communicate with multiple buddies substantially simultaneously. Further, in some cases, the user and each buddy may communicate with one another substantially simultaneously using, for example, the video chat module 130 or instant messaging module 136.

Each of the processes 200-700 have been described with operations occurring in a particular order. However, the processes 200-700 are not limited as such. For example, in the process 700, the block 714 may occur prior to the block 712. As a second example, in the process 500, the operations associated with the block 508 may occur prior to or substantially in parallel with the operations associated with the block 506.

Example User Interfaces

FIGS. 8A-8F illustrate several user interface screens for an example of a user interface 800. The user interface 800 is one non-limiting example of a user interface that may be used to access and interact with the communication system 120. Other user interfaces are possible. Further, other or additional user interface screens are possible.

The user interface 800 may be generated by the communication system 120 or any subsystem or related system thereof. Further, multiple systems may facilitate in the generation of one or more of the user interface screens. For example, in some cases, one or more of the user association module 122, the signature module 124, the email module 138, the video chat module 130, the calendar module 132, the communication director 126, the certification module 128, the video mail module 134, and the instant messaging module 136 may be involved in generating at least some of the user interface 800. Alternatively, or in addition, a user interface module (not shown) associated with the communication system 120 may facilitate in generating the user interface 800. One or more of the systems involved in generating the user interface 800 may also present the user interface 800 or cause the user interface 800 to be presented to a user at a client accessed by the user. In some cases, a display module (not shown) may be used to present the user interface 800 or cause the user interface 800 to be presented to the user at the client accessed by the user.

Although the user interface 800 is illustrated as a webmail user interface accessible with a browser, the user interface 800 is not limited as such. For example, in some cases, the user interface 800 may be an email client, may be included as a plug-in for an email client, may be a stand-alone software application, an application accessed from a mobile phone, or the like.

Figure 8A:
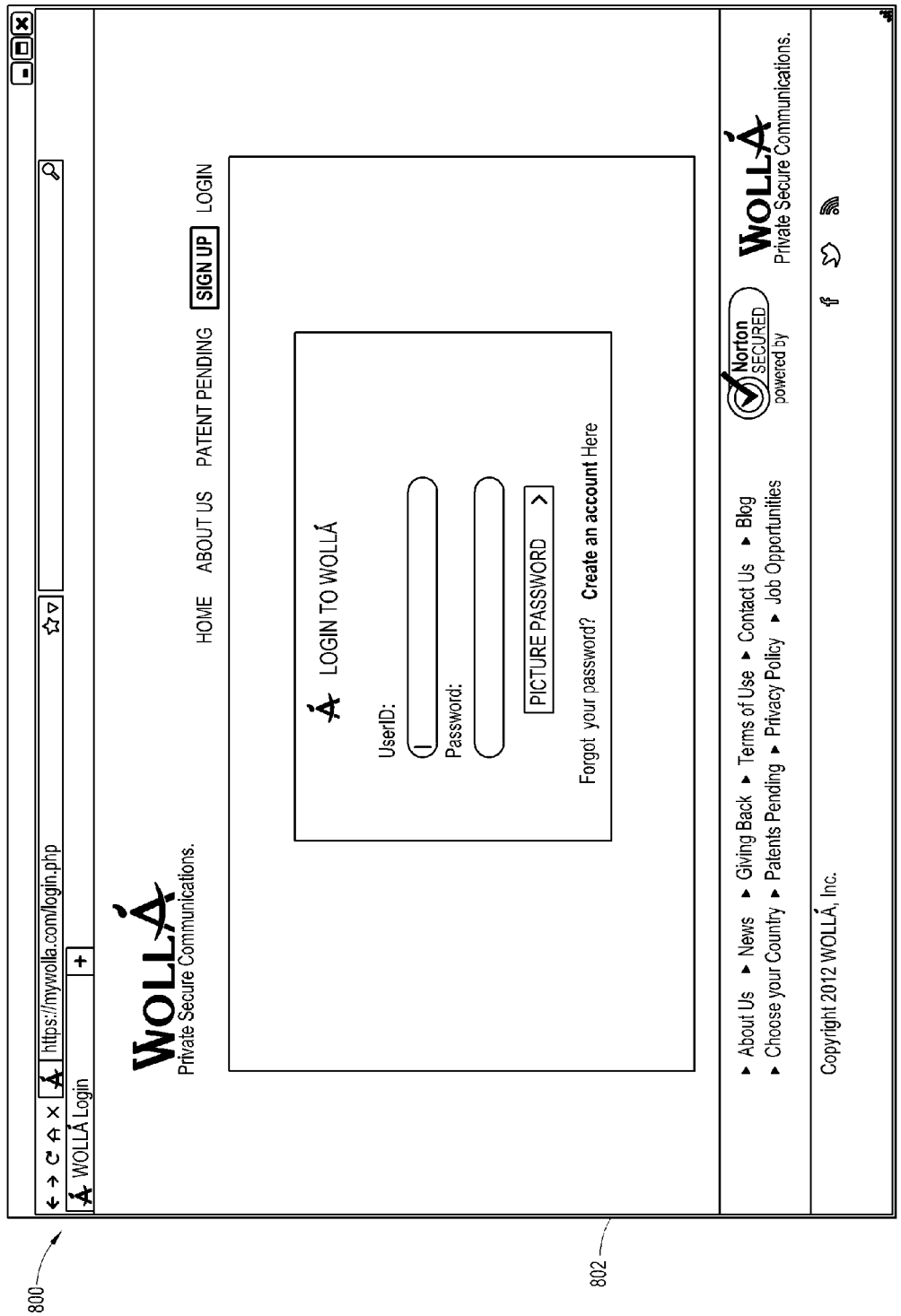
FIGS. 8A-8F illustrate several example user interface screens.

FIG. 8A illustrates one example of a login screen 802 for accessing the control system 120. Using the login screen 802, a user can provide authentication information that can be used by the communication system 120 to authenticate the user and to identify user's account with the communication system 120. The example illustrated in FIG. 8A enables a user to provider a user identifier and a password. In other embodiments, different information or additional information may be provided via the login screen 802. For example, a picture password may be used to access the communication system 120. Further, in some cases, the login process may include providing information via multiple user interface screens.

Figure 8B:
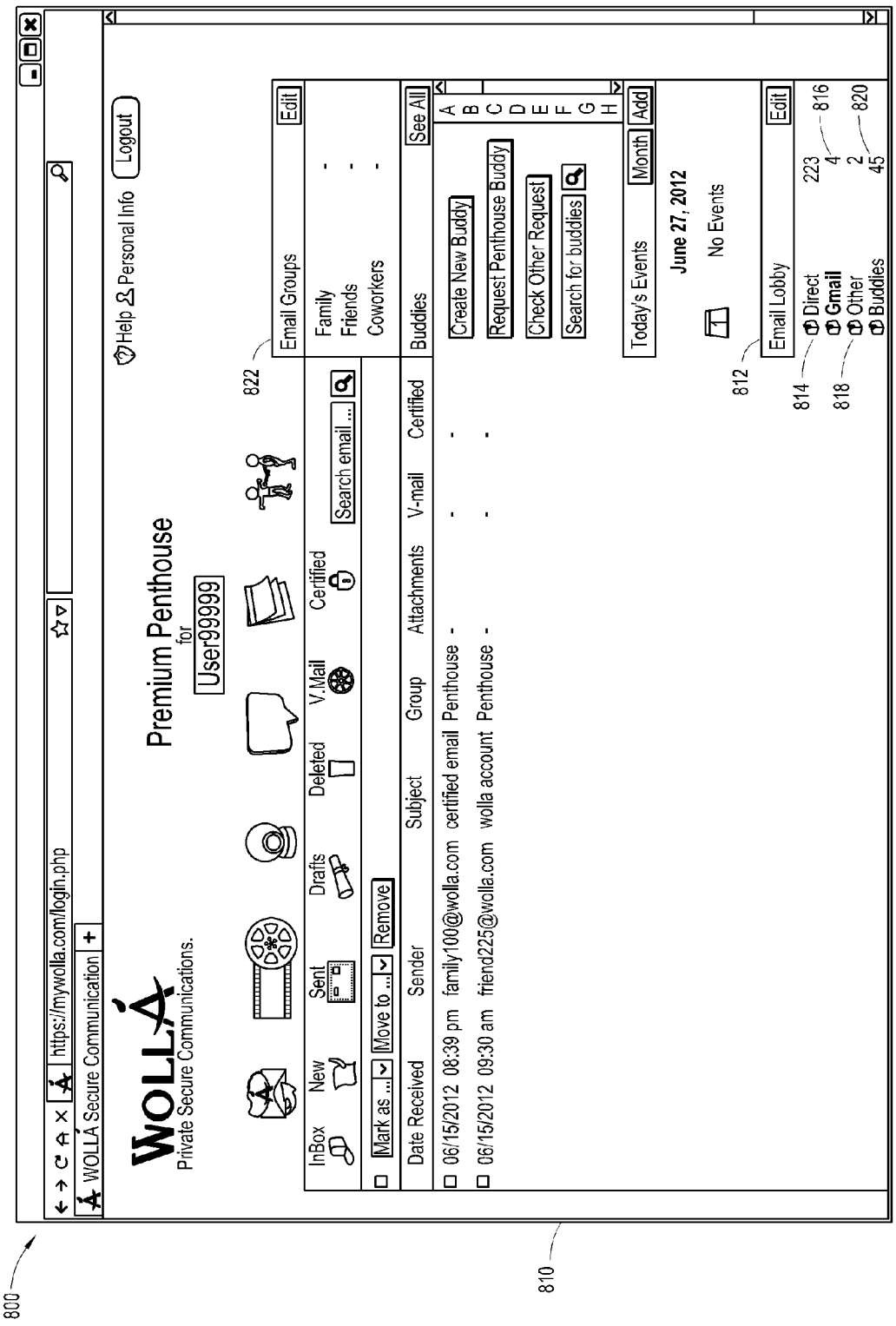

FIG. 8B illustrates one example of a priority inbox 810, or penthouse, for displaying priority emails to the user. The priority inbox 810 is presented to the user in response to the user successfully logging in to or accessing the communication system 120. Priority emails received using, for example, the process 400 are presented to the user via the priority inbox 810. The priority emails include emails received from other users of the communication system 120 who are buddies or approved contacts of the user. The user may access emails from other users by selecting from an email lobby 812 a link to one or more additional folders or inboxes that includes the emails not identified as priority or having the same priority level as emails accessible via the priority inbox 810. In some cases, all emails not identified as priority emails may be aggregated in a single email lobby 812 inbox. In other cases, the email lobby 812 may include multiple inboxes.

For example, as illustrated in FIG. 8B, the email lobby 812 includes four inboxes or folders: folders 812, 814, 816, and 820. Folder 814 can be configured for accessing emails received from email addresses provided by entities other than the entity that owns the communication system 120. Folder 816 can be configured to provide the user with access to an inbox for an email account of the user provided by an email provider other than the entity that owns the communication system 120, such as a Gmail® email account. Folder 818 can be configured to provide the user with access to emails received from other users of the communication system 120 who are not buddies or approved contacts of the user. Folder 820 can be configured to provide the user with access to emails received from other users who have been identified as friends or contacts of the user, but who have not, or have not yet, accepted the user's request to be an approved contact. In some cases, the folder 820 may be limited to contacts who are registered users of the communication system 120 and/or email addresses provided by the communication system 120. In other cases, the folder 820 may include emails from any contact that the user has identified as a friend or contact. Further, in some cases, the folder 820 may include emails from approved buddies whose emails the user does not want included in the priority inbox. Advantageously, the user can use this option with, for example, friends who send a lot of emails the user considers unimportant, but which the user would like separated from non-approved contacts. Although the folder 820 is titled "Buddies" in FIG. 8B, the contacts whose emails are placed in the folder 820 are generally not approved contacts, but may include contacts that the user has invited to become approved contacts or "buddies" as used with respect to the processes previously described.

In addition, the user can create one or more email groups, which can be used to group approved contacts or contacts of the user. The user can then access emails from members of an email group by selecting the email group from the email group panel 822.

Figure 8C:
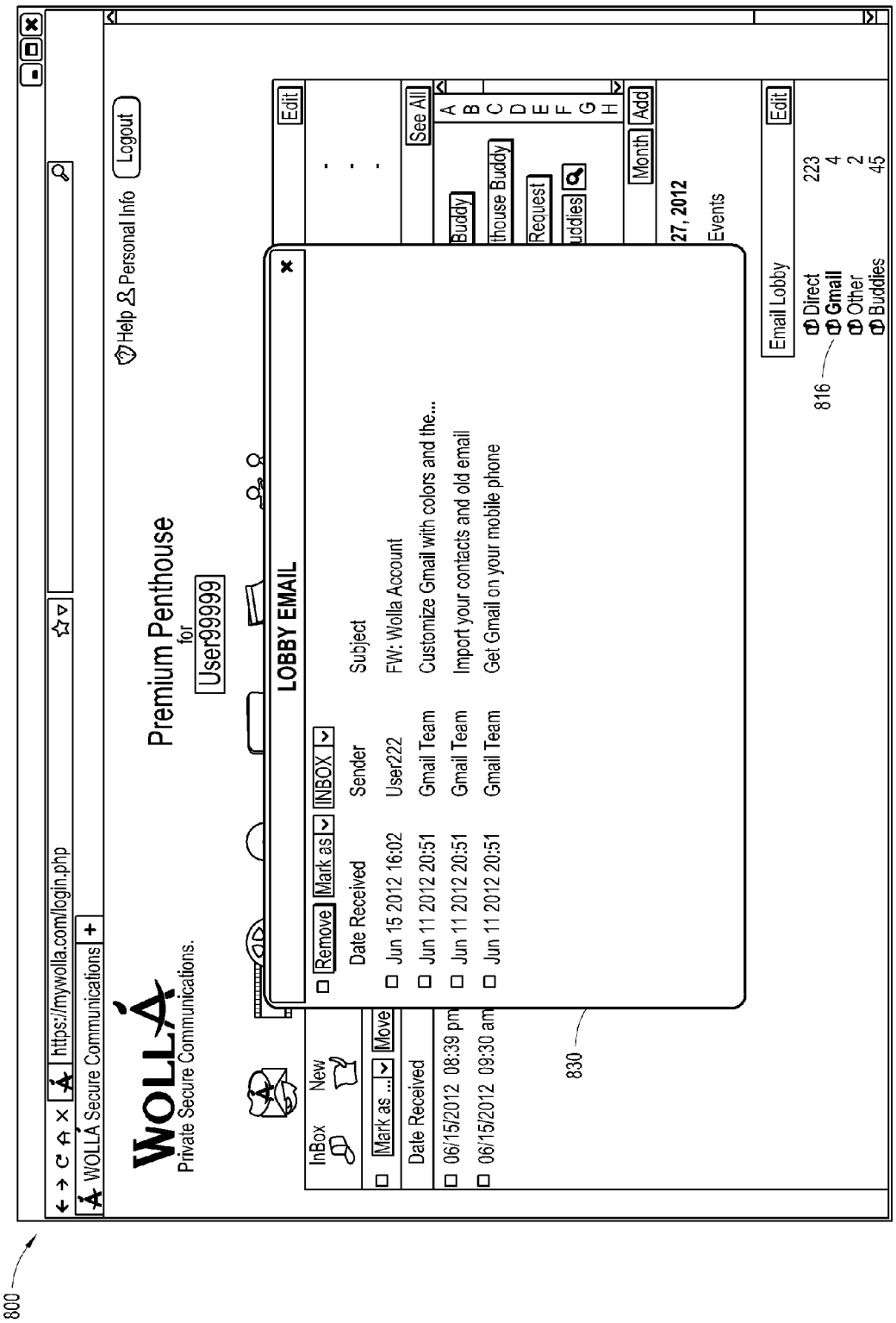

FIG. 8C illustrates one example of a lobby email inbox 830. In the example illustrated in FIG. 8C, the lobby email inbox 830 is associated with an email account of the user provided by an email provider other than the entity that owns the communication system 120. This lobby email inbox may be presented, for example, in response to the user selecting a link associated with the folder 816. In some cases, although accessible via the communication system 120, the email from the external email account, or email account from an entity other than the entity that owns the communication system 120, is not stored with the communication system 120 or at the database 140. In other cases, the email, or copies of the email, from the external email account may be stored with the communication system 120 or the database 140.

Figure 8D:
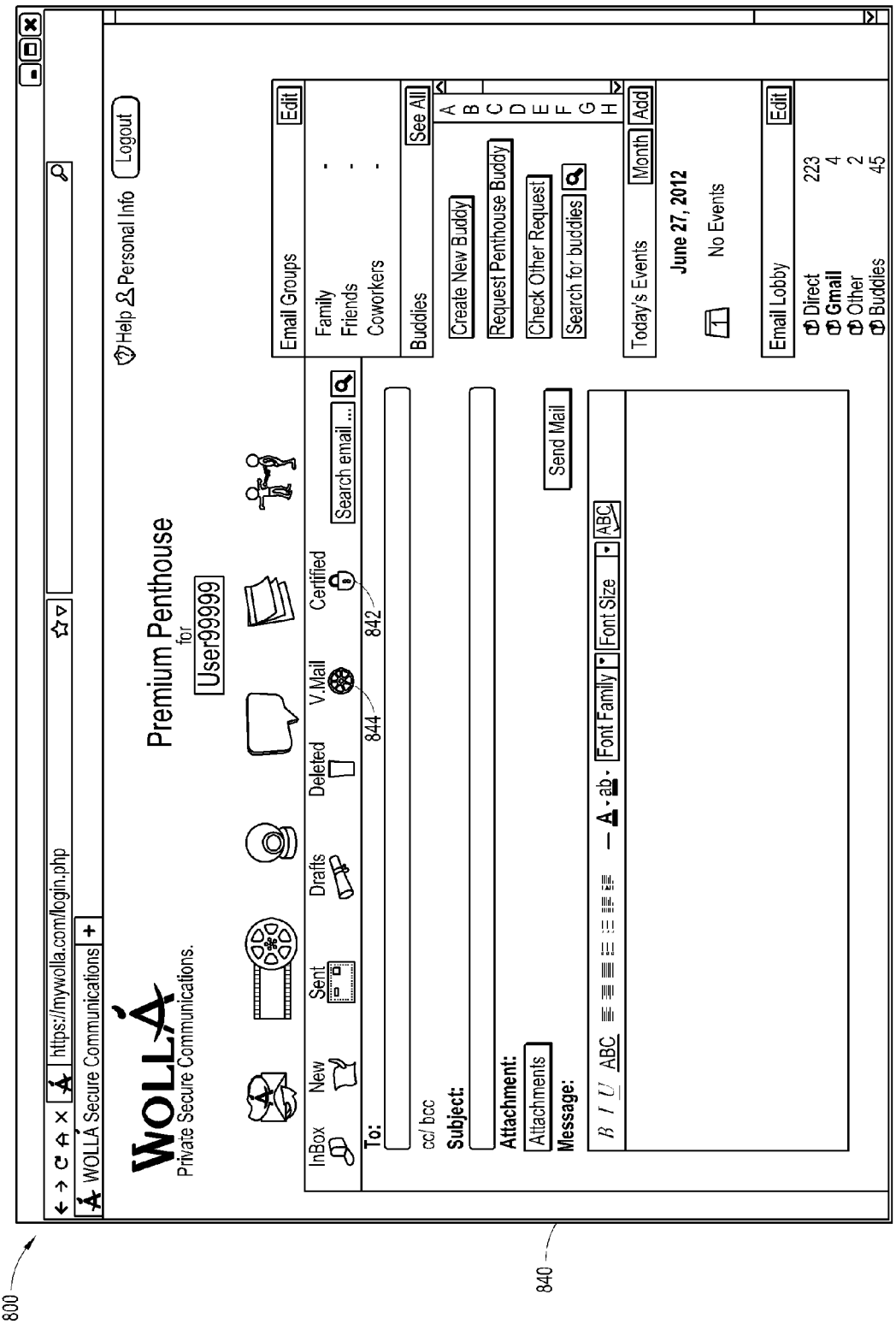

FIG. 8D illustrates one example of a compose message screen 840 that can be used to draft an email for sending using, for example, the process 300. In some cases, the user may select additional option when composing or sending the email or electronic communication. For example, the user may select a Certified email icon 842 to initiate a certification process, such as the process 600. As another example, the user can click a V-Mail icon 844 to send a video email instead of, or in addition to, sending the text based email.

Figure 8E:
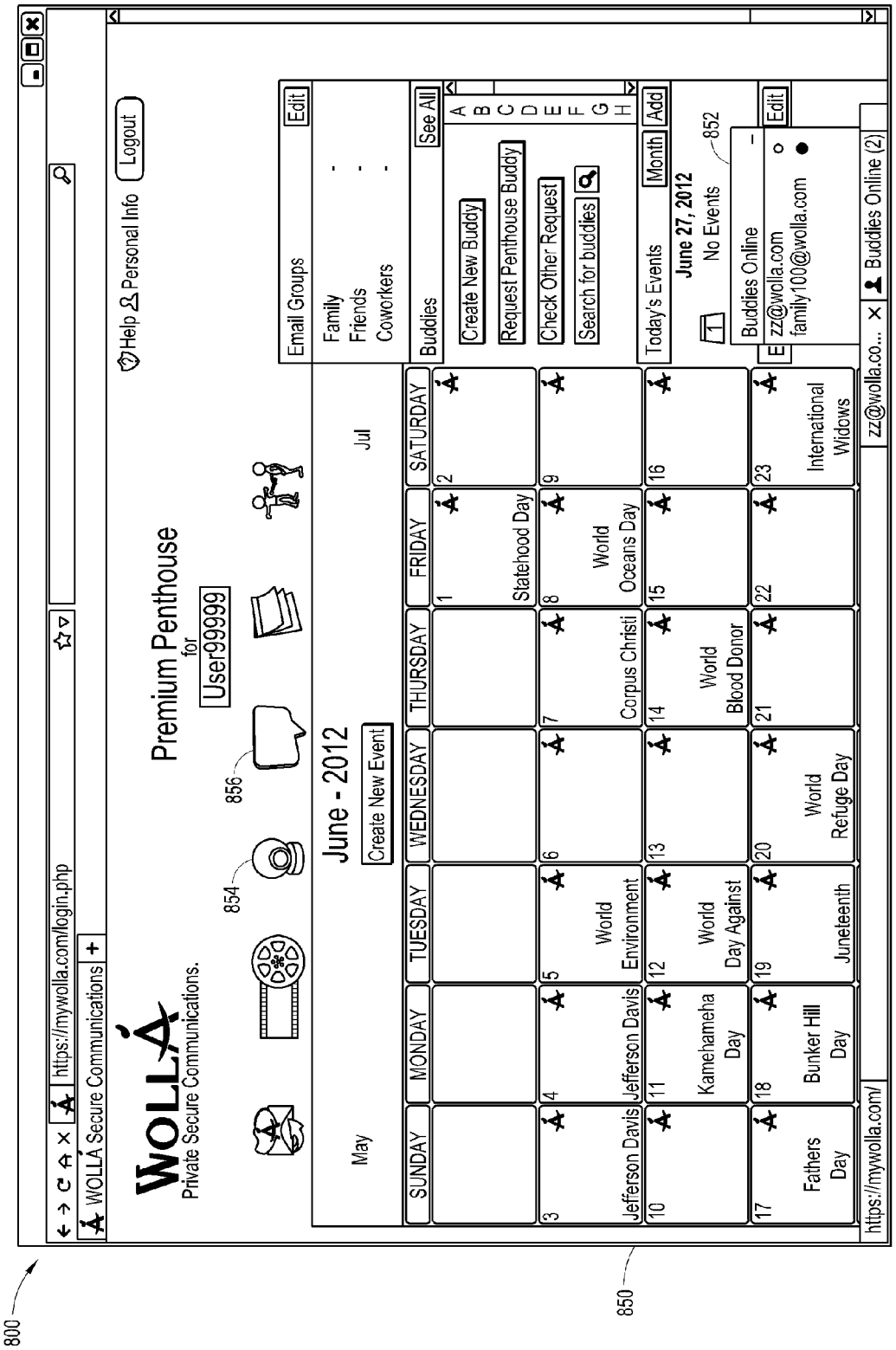

FIG. 8E illustrates one example of a calendar screen 850, which may be used to record appointments and to compose and send meeting invites to other users or email addresses regardless of whether the other users are users of the communication system 120. In addition, the user can select a buddy from a buddies online list 852 to communicate with via an instant communication option, such as instant messaging or video-chat. In some cases, the buddies online list 852 displays online buddies only. In other cases, the buddies online list 852 may list all buddies and identify the online buddies via an indicator, such as a green dot or a checkmark. In some cases, the buddies online list 852 is presented to the user upon the user successfully logging in to the communication system 120. In other cases, the buddies online list 852 is presented to the user in response to the user clicking a button, such as a video chat icon 854 or an instant messaging icon 856. Although the buddies online list 852 has been described in the same figure as the calendar screen 850, it should be understood that the buddies online list 852 and the instant communication options can be accessed from other screens, such as the compose message screen 840.

Figure 8F:
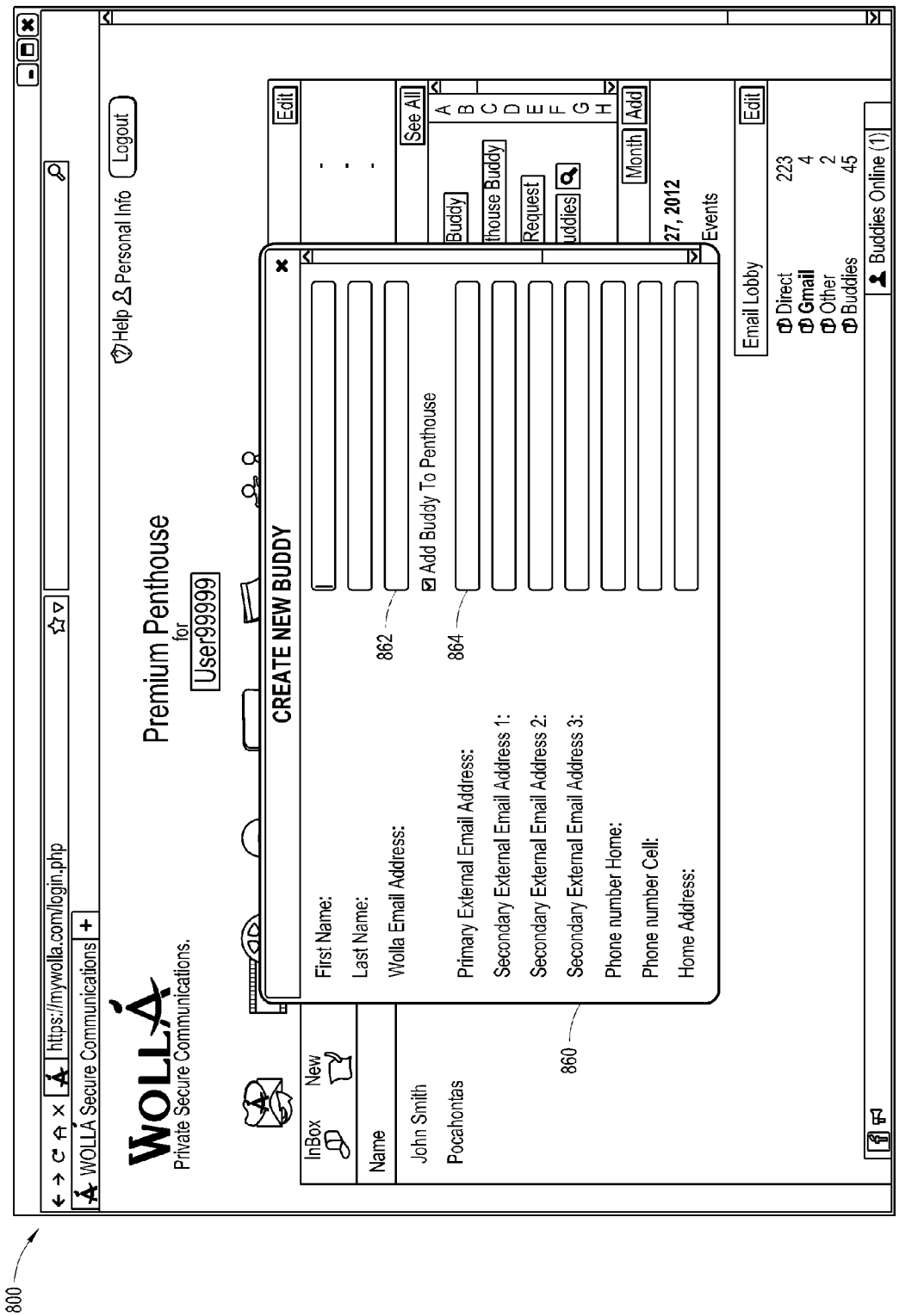

FIG. 8F illustrates one example of a create buddy screen 860. The user can invite a contact to become a buddy by entering the contact's email address provided by the communication system 120 in the communication system email field 862. Upon approval by the contact, the communication system 120 can exchange the public keys of the user and the contact thereby enabling priority communication between the user and the contact using priority communication processes, such as the process 300 and the process 400.

If the contact does not have an email address provided by the communication system 120, or if the user is unaware of such an email address, the user can enter the contact's non-communication system email address in the external email field 864. By providing the external email address, the user can cause the communication system 120 to invite the contact to sign up for an account with the communication system 120.

Regardless of whether the user has an account with the communication system 120 or not, if the contact does not become an approved contact of the user, emails from the contact can be separated from other emails in response to the user identifying the contact as a contact via, for example, the create buddy screen 860.

Additional Embodiments

As previously mentioned, in some embodiments, priority email can be implemented using a plug-in for an email client, such as Outlook. In such embodiments, the communication system 120 can generate public/private key pairs for the users and can exchange the public keys of users who are approved contacts by providing the public keys to the users' respective clients. The plug-in on the clients can store the public keys in a secure location on the client. Further, the plug-in can track the buddies of a user and when an email is received from a buddy, use the buddy's public key to verify any signatures that may be included with the email. If the signatures are verified, the email can be placed in the recipient's email client inbox. If the signatures were not verified, or were not included with the email, the plug-in can cause the email to be moved to another folder and to by pass the recipient's email inbox. In some cases, the communication system 120 can receive an email from a sender, create the signatures for the email, and then forward the email to the recipient.

In another embodiment, the email client plug-in can create and process priority email without using the communication system 120. In such cases, the plug-in can generate public/private key pairs and can provide the public keys to contacts who the user has identified as buddies and who have confirmed the user as a buddy. The plug-in can then create signatures using the users private keys upon determining that the user is sending an email to one of the buddies. When the email client receives an email, the plug-in can determine whether the email includes one or more signatures, and if so, it can verify the signatures. If the signatures are verified, the email is placed in the user's inbox. If the signatures are not verified, or were not included with the email, the email is placed in an alternative folder and bypasses the inbox.

Terminology

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS or iOS, a Linux or Unix-based OS, combinations of the same, or the like.

Further, the processing of the various components of the illustrated systems can be distributed across multiple machines, networks, and other computing resources. In addition, two or more components of a system can be combined into fewer components. For example, the various systems illustrated as part of the communication system 120 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for prioritized communication, the method comprising:
   outputting a graphical user interface (GUI) that provides functionality for a user to create a first email;
   receiving the first email that the user created with the GUI at a communication system;
   identifying an intended recipient of the first email;
   determining, by one or more processors, whether the intended recipient is included in a set of users associated with the first user;
   in response to determining that the intended recipient is included in the set of users:
      accessing a first private key associated with the first user;
      using the first private key to create a first signature based at least in part on the header of the first email;
      accessing a second private key associated with the first user;
      using the second private key to create a second signature based at least in part on the body of the first email; and
      sending the first email, the first signature, and the second signature to the intended recipient, thereby enabling a recipient communication system associated with the intended recipient to prioritize the first email;
   receiving a second email addressed to the first user at the communication system;
   identifying a sender of the second email;
   determining if the sender is included in the set of users associated with the first user; and
   in response to determining that the sender is included in the set of users associated with the first user:
      accessing a first public key associated with the sender;
      using the first public key to verify a first signature included with the second email;
      accessing a second public key associated with the sender;
      using the second public key to verify a second signature included with the second email; and
      in response to a successful verification of the first signature and the second signature, associating the second email with a priority inbox of the first user, thereby enabling the communication system to present the second email to the first user upon the first user accessing the communication system; and
   in response to determining that the sender is not included in the set of users associated with the first user, associating the second email with an inbox of the first user that is associated with a priority level that is lower than a priority level of the priority inbox, thereby enabling the communication system to hide the second email from the first user upon the first user accessing the communication system and until a point in time when the first user requests access to the second email.

2. The method of claim 1, wherein the communication system and the recipient communication system are the same.

3. The method of claim 1, wherein, in response to determining that the intended recipient is not included in the set of users, the method further comprises sending the first email without signatures to the intended recipient, thereby enabling the recipient communication system to prioritize the first email based on the lack of signatures.

4. The method of claim 1, wherein the first private key is associated with a first public key and the second private key is associated with a second public key, and wherein the method further comprises providing the first public key and the second public key to the set of users associated with the first user.

5. The method of claim 1, wherein sending the first email comprises sending an encrypted version of the first email.

6. The method of claim 1, wherein, in response to determining that the intended recipient is included in the set of users, the method further comprises:
   accessing a third private key associated with the first user; and
   encrypting the first email using the third private key to obtain an encrypted first email.

7. The method of claim 6, wherein the third private key is associated with a third public key, and wherein the method further comprises providing the third public key to the intended recipient.

8. The method of claim 7, wherein the method further comprises providing the third public key to the intended recipient without providing the third public key to additional users.

9. The method of claim 1, wherein, in response to an unsuccessful verification of at least one of the first signature and the second signature, the method further comprises rejecting the second email.

10. A system for prioritized communication, comprising:
    a communication director comprising computer hardware, the communication director configured to:
       receive a first email from a first user; and
       identify an intended recipient of the first email;
    a user association system configured to determine whether the intended recipient is in a set of one or more users associated with the first user by the first user;
    a signature system configured to create one or more signatures based on a portion of the email in response to the user association system determining that the intended recipient is included in the set of one or more users; and
    the communication director further configured to:
       send the first email and the one or more signatures to the intended recipient, thereby enabling a recipient communication system associated with the recipient to prioritize the first email;
       receive a second email addressed to the first user;
       identify a sender of the second email;
       determine if the sender is included in the set of one or more users associated with the first user; and
       in response to determining that the sender is included in the set of one or more users associated with the first user:
          access a first public key associated with the sender;
          use the first public key to verify a first signature included with the second email;
          access a second public key associated with the sender;
          use the second public key to verify a second signature included with the second email; and
          in response to a successful verification of the first signature and the second signature, associate the second email with a priority inbox of the first user, thereby enabling presentation of the second email to the first user upon the first user accessing the system; and in response to determining that the sender is not included in the set of users associated with the first user, associate the second email with an inbox of the first user that is associated with a priority level that is lower than a priority level of the priority inbox, thereby enabling the system to hide the second email from the first user upon the first user accessing the system and until a point in time when the first user requests access to the second email.

11. The system of claim 10, further comprising the recipient communication system.

12. The system of claim 10, wherein each of the one or more signatures is based on a different portion of the email.

13. The system of claim 10, wherein the signature system is further configured to:

access one or more private keys associated with the first user, the number of private keys corresponding to the number of signatures; and use the one or more private keys to create the one or more signatures, each signature created using a different private key.

14. The system of claim 13, wherein the one or more private keys are associated with one or more corresponding public keys, and wherein the user association system is further configured to provide the one or more corresponding public keys to the set of users.

15. The system of claim 10, further comprising a certification system configured to encrypt the email with a certification private key associated with the user to obtain an encrypted email.

16. The system of claim 15, wherein the communication director is further configured to send the encrypted email when sending the email and the one or more signatures to the intended recipient.

17. The system of claim 15, wherein the certification private key is associated with a certification public key, and wherein the user association system is further configured to provide the certification public key to the intended recipient.

18. The system of claim 10, further comprising an interface system configured to output a graphical user interface that enables the user to create the email.

19. Non-transitory physical computer storage comprising computer-executable instructions that, when executed by one or more processors, direct a computing system to perform a method for prioritized communication, the method comprising:

receiving a request at a communication system from a first user to associate a second user with the first user;

causing an indication of the request to be presented to the second user;

in response to causing the indication of the request to be presented to the second user, receiving a confirmation from the second user to associate the second user with the first user;

in response to receiving the confirmation, storing an association between the first user and the second user, wherein storing the association comprises including the second user in a first set of users associated with the first user;

receiving an email from the first user;

identifying an intended recipient of the email, the intended recipient comprising the second user;

determining whether the intended recipient is included in the first set of users associated with the first user;

in response to determining that the intended recipient is included in the first set of users, associating the email with a priority indicator and the intended recipient, thereby enabling a recipient communication system associated with the intended recipient to present the email to the intended recipient in a priority inbox; and in response to determining that the intended recipient is not included in the first set of users, associating the email with an inbox of the intended recipient that is associated with a priority level that is lower than a priority level of the priority inbox, thereby enabling the recipient communication system to hide the email from the intended recipient upon the intended recipient accessing the recipient communication system and until a point in time when the intended recipient requests access to the email.

20. The non-transitory physical computer storage of claim 19, wherein the communication system and the recipient communication system are the same communication system.

21. The non-transitory physical computer storage of claim 19, wherein storing an association between the first user and the second user further comprises including the first user in a second set of users associated with the second user.

22. A method for prioritized communication, the method comprising:

receiving an email addressed to a first user at a communication system;

identifying a sender of the email;

determining, by one or more processors, whether the sender is included in a set of users associated with the first user; and in response to determining that the sender is included in the set of users associated with the first user:

accessing at least one key associated with the sender;

using the at least one key to verify one or more signatures included with the email; and in response to a successful verification of the one or more signatures, associating the email with a priority inbox of the first user, thereby enabling the communication system to present the second email to the first user upon the first user accessing the communication system; and in response to determining that the sender is not included in the set of users associated with the first user, associating the second email with an inbox of the first user that is associated with a priority level that is lower than a priority level of the priority inbox, thereby enabling the communication system to hide the email from the first user upon the first user accessing the communication system and until a point in time when the first user requests access to the email.

23. The method of claim 22, wherein the number of keys corresponds to the number of signatures and each signature corresponds to a unique key from the at least one key.

* * * * *